US012752256B2

(12) United States Patent
Jang et al.

(10) Patent No.: US 12,752,256 B2
(45) Date of Patent: Oct. 6, 2026

(54) MICROWAVE REGENERATION OF CARBON DIOXIDE SORBENTS

(71) Applicant: UT-Battelle, LLC, Oak Ridge, TN (US)

(72) Inventors: Gyoung Gug Jang, Knoxville, TN (US); Radu Custelcean, Knoxville, TN (US); Xin Sun, Knoxville, TN (US); Constantinos Tsouris, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 517 days.

(21) Appl. No.: 18/235,081

(22) Filed: Aug. 17, 2023

(65) Prior Publication Data

US 2024/0082823 A1 Mar. 14, 2024

Related U.S. Application Data

(60) Provisional application No. 63/398,883, filed on Aug. 18, 2022.

(51) Int. Cl.
*B01J 20/34* (2006.01)
*B01J 20/22* (2006.01)

(52) U.S. Cl.
CPC ........... *B01J 20/3441* (2013.01); *B01J 20/22* (2013.01)

(58) Field of Classification Search
CPC .... B01J 20/3441; B01J 20/22; B01J 20/3425; B01J 20/3433

(Continued)

(56) References Cited

U.S. PATENT DOCUMENTS

| | | | | |
|---|---|---|---|---|
| 4,822,383 A * | 4/1989 | Brose | B01D 53/04 | 95/139 |
| 5,876,488 A * | 3/1999 | Birbara | B01J 20/28057 | 96/111 |

(Continued)

FOREIGN PATENT DOCUMENTS

| | | | |
|---|---|---|---|
| EP | 4282511 A1 * | 11/2023 | B01D 53/1406 |
| WO | WO-2025049440 A2 * | 3/2025 | B01J 20/3466 |
| WO | WO-2025264713 A1 * | 12/2025 | B01D 53/14 |

OTHER PUBLICATIONS

Christopher G. Gianopoulous et al., "Direct air capture of CO2—topological analysis of the experimental electron density (QTAIM) of the highly insoluble carbonate salt of a 2,6-pyridine-bis(iminoguanidine), (PyBIGH2)(CO3)(H2O)4." IUCrJ, 6, pp. 56-65. (Year: 2019).*

(Continued)

*Primary Examiner* — Patricia L. Hailey
(74) *Attorney, Agent, or Firm* — Scully, Scott, Murphy & Presser, P.C.

(57) ABSTRACT

A method for regenerating an amine-containing sorbent material useful in $CO_2$ capture, the method comprising exposing an amine-containing sorbent-$CO_2$ complex to microwave radiation to result in release of $CO_2$ and regenerated amine-containing sorbent that is uncomplexed with $CO_2$, wherein the amine-containing sorbent-$CO_2$ complex contains either: (i) a carbamate bond; or (ii) an ion pair bond of the formula (Continued)

wherein $R^a$, $R^b$, and $R^c$ are selected from H and hydrocarbon groups containing at least one carbon atom, wherein at least one of $R^a$, $R^b$, and $R^c$ is H; $X^{m-}$ is a carbonate or bicarbonate anion, with m being 1 for bicarbonate and 2 for carbonate; and n is an integer of 1 or 2, provided that n×m=2. The method may also include re-using the regenerated amine-containing sorbent to capture carbon dioxide.

6 Claims, 11 Drawing Sheets

(58) Field of Classification Search
USPC .................................. 502/5, 20, 22, 54, 400
See application file for complete search history.

(56) References Cited

U.S. PATENT DOCUMENTS

| | | | | |
|---|---|---|---|---|
| 10,583,387 | B2 | 3/2020 | Custelcean et al. | |
| 10,633,332 | B2 * | 4/2020 | Custelcean | C07C 281/18 |
| 2012/0027664 | A1 * | 2/2012 | Pinard Westendorf | B01D 53/1475 423/437.1 |
| 2014/0298996 | A1 * | 10/2014 | Meirav | B01J 20/3248 96/154 |
| 2018/0134655 | A1 * | 5/2018 | Custelcean | C07D 307/52 |
| 2020/0299251 | A1 * | 9/2020 | Zou | B01D 53/1481 |
| 2024/0375078 | A1 * | 11/2024 | Wenz | B01J 20/226 |
| 2025/0312725 | A1 * | 10/2025 | Gagne | B01D 53/08 |

OTHER PUBLICATIONS

Qianzhong Zhang et al., "Design, synthesis, and physicochemical study of a biomass-derived CO2 sorbent 2,5-furan-bis(iminoguanidine)." iScience, 24, pp. 1-61. (Year: 2021).*
Bartolo Gabriele et al., "Amidine- and guanidine-based synthetic methods for CO2 capture and utilization." Green and Sustainable Chemistry 41, pp. 1-12. (Year: 2023).*
Abishek Kasturi et al., "Carbon dioxide capture with aqueous amino acids: Mechanistic study of amino acid regeneration by guanidine crystallization and process intensification." Separation and Purification Technology 271, pp. 1-8. (Year: 2021).*
Bougie, F., et al., "Microwave regeneration of monoethanolamine aqueous solutions used for CO2 capture", International Journal of Greenhouse Gas Control (2018), Received Jul. 13, 2018, Received in revised form Oct. 9, 2018, Accepted Oct. 20, 2018, pp. 165-172, 79.
Brethomé, F.M., et al., "Direct air capture of CO2 via aqueous-phase absorption and crystalline-phase release using concentrated solar power", Nature Energy, Jul. 2018, pp. 553-559, vol. 3.
Chronopoulos, T., et al., "Utilisation of microwave energy for CO2 desorption in postcombustion carbon capture using solid sorbents", Energy Procedia (2014), pp. 2109-2115, 63.
Cui, G., et al., "Active chemisorption sites in functionalized ionic liquids for carbon capture", Chem. Soc. Rev., 2016, pp. 4307-4339, 45.
Custelcean, R., et al., "Direct Air Capture of CO2 with Aqueous Amino Acids and Solid Bisiminoguanidines (BIGs)", Ind. Eng. Chem. Res. 2019, pp. 23338-23346, 58.
Custelcean, R., et al., "Dialing in Direct Air Capture of CO2 by Crystal Engineering of Bisiminoguanidines", ChemSusChem 2020, pp. 6381-6390, 13.
Custelcean, R.., "Direct air capture with bis-iminoguanidines: From discovery to commercialization", Chem, Nov. 11, 2021, pp. 2848-2852, 7.
Custelcean, R., et al., "Direct air capture of CO2 via crystal engineering", Chem. Sci., 2021, Received Jul. 26, 2021, Accepted Sep. 12, 2021, pp. 12518-12528, 12.
Estel, L., et al., "Continuous flow-microwave reactor: Where are we?", Chemical Engineering and Processing: Process Intensification (2017), Received Mar. 31, 2016, Received in revised form Sep. 23, 2016, Accepted Sep. 27, 2016, Available online Sep. 28, 2016, pp. 56-64, 113.
Husebye, J., et al., "Techno economic evaluation of amine based CO2 capture: impact of CO2 concentration and steam supply", Energy Procedia (2012), pp. 381-390, 23.
Jang, G.G., et al., "Process intensification of CO2 capture by low-aqueous solvent", Chemical Engineering Journal 426 (2021), Received Apr. 11, 2021, Received in revised form Jul. 2, 2021, Accepted Jul. 6, 2021, Available online Jul. 12, 2021, pp. 1-15, 131240.
Jang, G.G., et al., "Process Intensification of CO2 Capture by Low-Aqueous Solvent", Submitted to Chemical Engineering Journal, Manuscript_8cb1e3d961d4161583fd1b3ad87ca6a3, Apr. 2021, 42 pages.
Jang, G.G., et al., "Ultra-fast microwave regeneration of CO2 solid sorbents for energy-efficient direct air capture", Separation and Purification Technology 309 (2023), Received Nov. 2, 2022, Received in revised form Dec. 9, 2022, Accepted Dec. 27, 2022, Available online Dec. 29, 2022, pp. 1-11, 123053.
Lail, M., et al., "Non-Aqueous Solvent (NAS) CO2 Capture Process", Energy Procedia (2014), pp. 580-594, 63.
Li, K., et al., "Systematic study of aqueous monoethanolamine-based CO2 capture process: model development and process improvement", Energy Science and Engineering 2016, Received May 31, 2015, Revised Oct. 5, 2015, Accepted Oct. 6, 2015, pp. 23-39, 4(1).
Li, Y., et al., "Screening and Performance Evaluation of Triethylenetetramine Nonaqueous Solutions for CO2 Capture with Microwave Regeneration", Energy Fuels 2020, Received Jun. 18, 2020, Revised Aug. 12, 2020, Published Aug. 17, 2020, pp. 11270-11281, 34.
Liu, C., et al., "Dielectric Properties and Microwave Heating Characteristics of Sodium Chloride at 2.45 GHz", High Temp. Mater. Proc. 2013, Received Jan. 17, 2013. Accepted Apr. 1, 2013, pp. 587-596, 32(6).
Mcgurk, S.J., et al., "Microwave swing regeneration of aqueous monoethanolamine for postcombustion CO2 capture", Applied Energy, Received Sep. 22, 2016, Received in revised form Jan. 16, 2017, Accepted Feb. 6, 2017, Available online Feb. 14, 2017, pp. 126-133, 192.
Notz. R., et al., "Post combustion CO2 capture by reactive absorption: Pilot plant description and results of systematic studies with MEA", International Journal of Greenhouse Gas Control (2012), Received Jul. 20, 2010, Received in revised form Aug. 29, 2011, Accepted Nov. 8, 2011, Available online Dec. 30, 2011, pp. 84-112, 6.
Rim, G., et al., "Solvent Impregnated Polymers Loaded with Liquid-Like Nanoparticle Organic Hybrid Materials for Enhanced Kinetics of Direct Air Capture and Point Source CO2 Capture", Adv. Funct. Mater. 2021, Received Nov. 22, 2020, Revised Feb. 20, 2021, Published online Mar. 18, 2021, pp. 1-13, 2010047, 31.
Seipp, C.A.., "CO2 Capture from Ambient Air by Crystallization with a Guanidine Sorbent", Angew. Chem. 2017, pp. 1062-1065, 129.
Stamberga, D., et al., "Synergistic direct air capture of CO2 with aqueous guanidine/amino acid solvents", MRS Advances 2022, Received Nov. 9, 2021, Accepted Mar. 1, 2022, Published online Mar. 8, 2022, pp. 399-403, 7(19).
Tsubaki, S., et al., "Insights into the Dielectric-Heating-Enhanced Regeneration of CO2-Rich Aqueous Amine Solutions", ACS Sustainable Chem. Eng. 2020, Received Jul. 21, 2020, Revised Aug. 8, 2020, Published Aug. 13, 2020, pp. 13593-13599, 8.
Williams, N.J., et al., "CO2 Capture via Crystalline Hydrogen-Bonded Bicarbonate Dimers", Chem, Received Oct. 24, 2018, Revised Nov. 22, 2018, Accepted Dec. 23, 2018, Published Jan. 31, 2019, Mar. 14, 2019, pp. 719-730, 5.
Zeng, S., et al., "Ionic-Liquid-Based CO2 Capture Systems: Structure, Interaction and Process", Chem. Rev. 2017, Received Jan. 30, 2017, Published Jul. 7, 2017, pp. 9625-9673, 117.

* cited by examiner

MGBIG Carbonate $R_1$ = H; $R_2$ = Me (MGBIG)

MICROWAVE REGENERATION OF CARBON DIOXIDE SORBENTS

CROSS REFERENCE TO RELATED APPLICATION

The present application claims benefit of U.S. Provisional Application No. 63/398,883, filed on Aug. 18, 2022, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention generally relates to methods for regenerating sorbent materials, particularly amine-containing and guanidine-containing sorbent materials, useful in capturing and removing carbon dioxide from a gaseous or liquid source.

BACKGROUND

Regeneration of $CO_2$-capture solvent/sorbents in direct air capture (DAC) is becoming a significant part of the overall operational cost (~70% of total operating cost) in continuous DAC processes. For this reason, more efficient regeneration will become increasingly sought to permit solvent reuse and sustain stable $CO_2$ capture performance over time. Current research efforts on efficient regeneration have been mainly focused on developing low-energy-regeneration solvents and sorbents and their potential use in traditional temperature-swing processes. Although conductive heating systems are well-matured for large scale implementation, conventional solvent regeneration by conductive heating is often inefficient, especially for traditional aqueous solvents (e.g., 30 wt % monoethanolamine (MEA)), due to non-uniform heating and overheating, which also leads to solvent degradation. In general, $CO_2$ desorption from aqueous solvents occurs with diluent evaporation, resulting in a high energy penalty. Thus, there would be a significant benefit in a method that could regenerate $CO_2$ sorbents in a more energy efficient manner.

SUMMARY

The present disclosure is foremost directed to a method for regenerating amine-containing sorbent materials from a $CO_2$ complex thereof by exposing the amine-containing sorbent-$CO_2$ complex to microwave radiation at sufficient power and over a period of time that results in release of $CO_2$ from the complex and regeneration of the amine-containing sorbent (i.e., uncomplexed with $CO_2$). In some embodiments, the sorbent-$CO_2$ complex is a solid (e.g., crystalline) complex. In other embodiments, the sorbent-$CO_2$ complex is a solution of the complex in an aqueous lean solvent solution containing no more than 10% or 20% water.

More particularly, the method includes exposing an amine-containing sorbent-$CO_2$ complex to microwave radiation to result in release of $CO_2$ from the complex and regenerated amine-containing sorbent that is uncomplexed with $CO_2$. The regenerated amine-containing sorbent contains at least one free amine group capable of directly or indirectly reacting with $CO_2$ to produce the sorbent-$CO_2$ complex.

The amine-containing sorbent-$CO_2$ complex contains either: (i) a carbamate bond; or (ii) an ion pair bond of the formula:

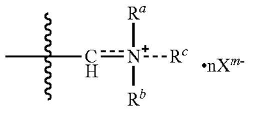

wherein $R^a$, $R^b$, and $R^c$ are selected from H and hydrocarbon groups containing at least one carbon atom, wherein at least one of $R^a$, $R^b$, and $R^c$ is H; the dashed double bond represents the presence or absence of a double bond, and the dashed single bond represents the presence or absence of $R^c$, wherein $R^c$ is present only if the double bond is not present; $X^{m-}$ is a carbonate or bicarbonate anion, with m being 1 for bicarbonate and 2 for carbonate; and n is an integer of 1 or 2, provided that n×m=2. The carbamate bond or ion pair bond results from direct or indirect reaction of at least one free amine group in the uncomplexed sorbent material with $CO_2$. The sorbent-$CO_2$ complex is a solid complex or a complex in a solution containing no more than 20% water.

The microwave regeneration process described herein increases the regeneration rate and reduces the energy consumption compared to the conventional, conductive, thermal regeneration. As a proof-of-principle, it was herein demonstrated that two types of $CO_2$ capture reagents, i.e., 1) low aqueous solvent (LAS), and 2) solid bis(iminoguanidines) (BIGs), such as methylglyoxal-bis(iminoguanidine) (MGBIG), were efficiently regenerated up to ~100% recovery by microwaves at 2.54 GHz frequency. Full solvent regeneration via microwave heating, as herein demonstrated, represents a significant advance in $CO_2$ sorbent regeneration. Also, microwave heating demonstrated ultrafast regeneration of the MGBIG sorbent at ~17 times faster desorption rate, resulting in >40% lower energy consumption, compared to a traditional conductive heating process at 160° C. Microwave irradiation selectively heats up $CO_2$-binding molecules (e.g., polar carbamate and carbonate-water complexes) in a water-lean matrix or BIG-carbonate crystals, respectively, resulting in ultrafast, effective, and energy efficient regeneration.

BRIEF DESCRIPTION OF THE DRAWINGS

FIG. 3A shows a photo of sample (1 g C-MGBIG_Ph3 in a 5-mL glass vial) in the microwave oven. FIG. 3B shows an infrared image of the sample after 30 s of microwave irradiation. FIG. 3C is a photo of microwave regenerated MGBIG_Ph3 (Batch 1) solids from 5 to 120 s. FIG. 3D is a photo of microwave regenerated MGBIG_Ph3 solids up to 8 min. FIG. 3E is a graph showing mass loss of C-MGBIG after microwave heating over time. FIG. 3F is a graph showing corresponding carbon (i.e., $CO_2$) amount in the regenerated solids and $CO_2$ regeneration efficiency.

FIG. 4A shows FTIR spectra during regeneration of C-MGBIG at 0 min. The peak at around 2500 $cm^{-1}$ corresponds to $CO_2$ and the peaks at approximately 1500 $cm^{-1}$ and 4000 $cm^{-1}$ correspond to water vapor. FIG. 4B is a graph showing DSC/TGA data during regeneration of C-MGBIG at 0-min microwave irradiation. The curve in green corresponds to the TGA analysis, the curve in black depicts the reaction temperature, and the curve in blue corresponds to the heat flow to the sample. FIG. 4C shows FTIR spectra during regeneration of C-MGBIG at 3-min microwave irradiation. FIG. 4D is a graph showing DSC/TGA data during regeneration of C-MGBIG at 3-min microwave irradiation. FIG. 4E shows FTIR spectra during regeneration of C-MGBIG at 5-min microwave irradiation. FIG. 4F is a graph showing DSC/TGA data during regeneration of C-MGBIG at 5-min microwave irradiation.

FIG. 8A is a graph showing the effect of microwave power on mass loss rate of 1 g C-MGBIG. The inset table shows the input electrical power to the microwave for a certain output power (100% corresponds to 1,250 W output). FIG. 8B is a graph showing cumulative energy consumption (KWh) for different microwave power levels and conductive heating at 160° C. The arrows indicate full regeneration time for each sample, while the horizontal line at 0.14 KWh cumulative energy indicates that full regeneration by conductive heating requires the same energy as microwave regeneration at 100% power. FIG. 8C is a graph showing the effect of sample mass (or volume) on mass loss by microwave heating (samples are placed in 30-mL vials). FIG. 8D is a photo of microwave regenerated samples discussed in graph FIG. 8C.

FIG. 9A is a graph showing Influence of sample mass on regeneration efficiency between μ-wave heating and conductive heating (CH). Thermal degradation occurred due to hot spot (*). FIG. 9B is a graph showing direct measurement of cumulative energy consumption for μ-wave heating (100%, ~1,670 W) and conductive heating (CH).

FIG. 10A is a graph showing microwave regeneration efficiency of C-MGBIG_Ph1 (1 g), in terms of mass loss (wt. %), compared with that of C-MGBIG_Ph3. FIG. 10B is shows X-ray diffraction patterns of microwave regeneration of C-MGBIG_Ph1. Note: C-MGBIB=carbonate crystals of MGBIG, and MGBIG-FB=carbonate free-base MGBIG.

DETAILED DESCRIPTION

Figure 1:
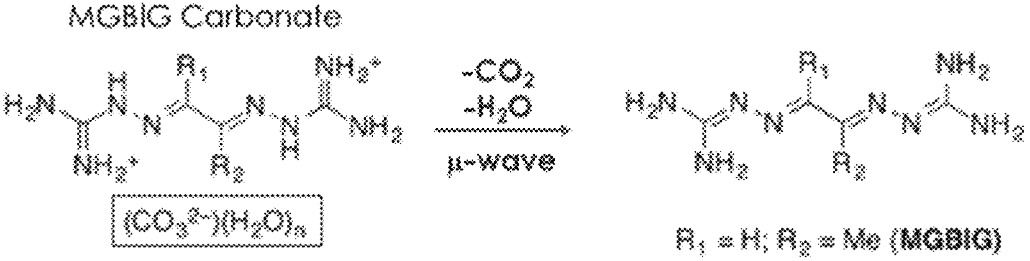
FIG. 1. Schematic diagram showing selective microwave regeneration of methylglyoxal-bis (iminoguanidine) (MGBIG) carbonate salt crystals.

The amine-containing sorbent may be any of the carbon dioxide ($CO_2$) sorbents known in the art. The term "amine-containing sorbent," as used herein, refers to materials that form a complex with (i.e., absorb) carbon dioxide by either: (i) forming a carbamate bond between an amine group of the sorbent and the carbon dioxide, or (ii) forming an ion pair bond between an amine group of the sorbent and a reaction product of carbon dioxide, such as carbonate or bicarbonate. As well known, carbon dioxide can be converted to carbonate or bicarbonate by contact with an initial quick-absorbing sorbent, such as MOH alkaline aqueous solution, wherein M is, for example, $Na^+$ or $K^+$.

In one set of embodiments, the amine-containing sorbent is a hydrophobic amine that can dissolve in an organic (non-aqueous) solvent (NAS) or low-aqueous solvent (LAS). The hydrophobic amine typically has the formula $NR^dR^eR^f$, wherein $R^d$, $R^e$, and $R^f$ are selected from H and hydrocarbon groups containing at least two carbon atoms, wherein at least one of $R^d$, $R^e$, and $R^f$ is selected from hydrocarbon groups containing at least or more than two, three, or four carbon atoms. The hydrocarbon groups typically have up to six, eight, ten, or twelve carbon atoms and may or may not contain one or more heteroatoms selected from O, N, and S. Some examples of hydrocarbon groups include ethyl, n-propyl, isopropyl, n-butyl, isobutyl, n-pentyl, n-hexyl, isohexyl, n-octyl, 2-ethylhexyl, 2-ethyloctyl, n-decyl, n-dodecyl, cyclohexyl, phenyl, pyridyl, and tolyl groups. Upon absorption of carbon dioxide, the resulting amine-containing sorbent-$CO_2$ complex typically contains a carbamate bond. The carbamate bond results from direct or indirect reaction of at least one free amine group in the uncomplexed sorbent material with $CO_2$. For example, an amine of the formula $R^d$—$NH_2$ can react with $CO_2$ to produce a carbamate molecule of the formula $R^d$—NH—C(O)$O^-$ or $R^d$—NH—C(O)OH. The regenerated hydrophobic amine contains at least one free amine group capable of directly or indirectly reacting with $CO_2$ to produce the sorbent-$CO_2$ complex. Typically, the regenerated amine-containing sorbent is re-used to capture $CO_2$.

In some embodiments, the amine-containing sorbent reacts with carbon dioxide to form an ion pair bond of the formula:

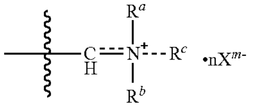

wherein $R^a$, $R^b$, and $R^c$ are selected from H and hydrocarbon groups containing at least one carbon atom (e.g., methyl and any of the hydrocarbon groups described above), wherein at least one of $R^a$, $R^b$, and $R^c$ is H; the dashed double bond represents the presence or absence of a double bond (i.e., if the dashed double bond is absent, the single bond to $R^c$ remains), and the dashed single bond represents the presence or absence of $R^c$, wherein $R^c$ is present only if the double bond is not present (or conversely, $R^c$ is absent if the double bond is present); $X^{m-}$ is a carbonate or bicarbonate anion, with m being 1 for bicarbonate and 2 for carbonate; and n is an integer of 1 or 2, provided that n×m=2.

More specifically, the ion pair bond has any of the following two formulas:

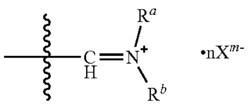

and

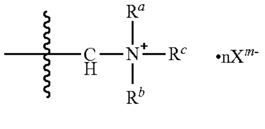

In some embodiments, the amine-containing sorbent is a guanidine-containing sorbent. The guanidine-containing sorbent may more specifically have a bis(iminoguanidine) structure, such as the following structure:

(1)

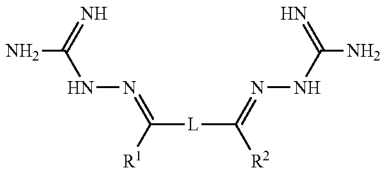

wherein L is a bond or a hydrocarbon linker containing 1-12 carbon atoms (e.g., alkylene, alkenylene, or cyclic) and optionally containing one or more heteroatoms selected from O, N, and S; and $R^1$ and $R^2$ are independently selected from H and hydrocarbon groups containing 1-12 carbon atoms, such as described above, and may or may not contain one or more heteroatoms selected from O, N, and S. The regenerated guanidine contains at least one free amine group capable of directly or indirectly reacting with $CO_2$ to produce the sorbent-$CO_2$ complex. Typically, the regenerated guanidine-containing sorbent is re-used to capture $CO_2$.

Upon absorption of carbon dioxide, the resulting bis(iminoguanidinium) sorbent-$CO_2$ complex may have the following ion pair structure:

(2)

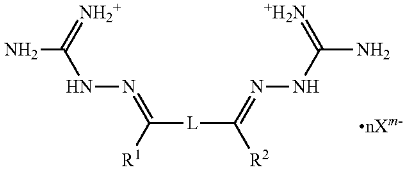

wherein L, $R^1$, and $R^2$ are as described above and $X^{m-}$ is a carbonate or bicarbonate anion, with m being 1 for bicarbonate and 2 for carbonate, and n is an integer of 1 or 2; provided that n×m=2. The ion pair bond results from direct or indirect reaction of at least one free amine or imine group in the uncomplexed sorbent material with $CO_2$.

In one set of embodiments Formula (2), L is a bond and the bis(iminoguanidinium) sorbent-$CO_2$ complex has the following ion pair structure:

(2a)

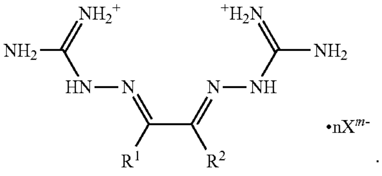

.

In another set of embodiments Formula (2), L is cyclic, such as an aromatic ring, such as a phenylene, pyridinyl, cyclopentadienyl, or pyrrolyl ring. In particular embodiments, the bis(iminoguanidinium) sorbent-$CO_2$ complex has any of the following ion pair structures:

(2b)

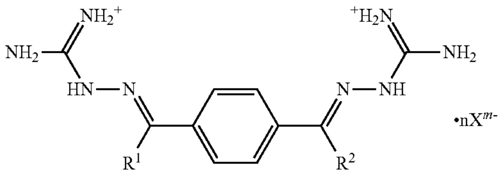

and (2c)

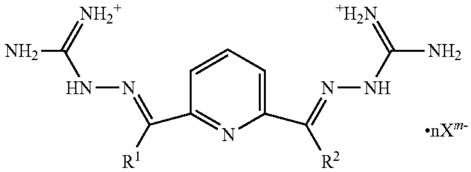

.

In embodiments where the amine-containing sorbent-$CO_2$ complex is in solution, the solution is aqueous lean by containing no more than or less than 20% water, typically in admixture with an organic solvent, such as ethanol, tetrahydrofuran, or toluene. In other embodiments, the solution contains no more than or less than 15%, 10%, 5%, 2%, or 1% water. In yet other embodiments, the solution contains substantially no water or a trace of water (typically less than 1%). In other embodiments, the amine-containing sorbent-$CO_2$ complex is a solid. In some embodiments, the solid complex is crystalline. The solid complex may contain a hydrophobic amine or a guanidine. Typically, the iminoguanidinium-$CO_2$ complexes have a greater capacity for producing solid crystalline ion pair forms.

In the method for regenerating an amine-containing sorbent material, an amine-containing sorbent-$CO_2$ complex, as described above, is exposed to microwave radiation to result in release of $CO_2$ and a regenerated amine-containing sorbent that is uncomplexed with $CO_2$. The microwave radiation can have a frequency within the entire microwave range, but is more typically a frequency within a range 1-10 GHz, 1-5 GHz, 2-10 GHz, 2-5 GHz, 2-4 GHz, or 2-3 GHz. The microwave radiation typically has a power of at least or above 500 W, 750 W, 1000 W, 1250 W, 1500 W, 1750 W, or 2000 W. Moreover, the sorbent-$CO_2$ complex is typically exposed to the microwave radiation within any of the above frequency ranges and power for at least 10 seconds, 20 seconds, 30 seconds, 60 seconds, 90 seconds, 120 seconds, 180 seconds, or 240 seconds, or within a range of time bounded by any two of the foregoing values. In some embodiments, electrical energy from a renewable source (e.g., solar, wind, or hydroelectric) is used to drive the microwave radiation output. Typically, the $CO_2$ that is released is concentrated and pressurized for more permanent capture/storage or later use, or the $CO_2$ is converted to a useful commodity, or both.

In other aspects, the present invention is directed to the initial process or step of producing the amine-containing sorbent-$CO_2$ complex. The amine-containing sorbent-$CO_2$ complex may be produced from an initial (fresh) source of amine-containing sorbent or an amine-containing sorbent that was regenerated from the process described above. In either case, the method involves contacting a gaseous source containing $CO_2$ with an aqueous solution of an amine-containing sorbent, such as any of these described above, that captures the $CO_2$ by forming a carbamate bond or an ion pair bond by reaction of the $CO_2$ with the amine (one or more amine groups) in the sorbent. The amine-containing sorbent may be a hydrophobic amine or a guanidine-based or bis(guanidine)-based molecule such as shown in Formula (1).

In embodiments, a gaseous source containing carbon dioxide is contacted with an aqueous solution of a quick-absorbing carbon dioxide ($CO_2$) sorbent that reacts with carbon dioxide to form an aqueous-soluble carbonate or bicarbonate salt of the carbon dioxide sorbent. The foregoing step may herein be referred to as a first step, i.e., step (i). The gaseous source can be any volume of gas containing carbon dioxide. The gaseous source can be, for example, air, waste gas from an industrial or commercial process, flue gas from a power plant, exhaust from an engine, or sewage or landfill gas. The term "aqueous," as used herein, refers to the presence of water. In some embodiments, the only liquid in the solution is water, while in other embodiments, the liquid in the solution may be water in admixture with a water-soluble organic solvent, such as an alcohol, acetone, or tetrahydrofuran. The $CO_2$ sorbent may be, for example, one or more organoamines, alkali hydroxides (e.g., NaOH or KOH), alkali carbonates (e.g., $Na_2CO_3$ or $K_2CO_3$), and/or alkaline earth hydroxides (e.g., $Ca(OH)_2$), or a combination thereof. The organoamines may be primary or secondary amines. Some examples of conventional organoamines include methylamine, ethylamine, ethylenediamine, ethanolamine (monoethanolamine), and diethanolamine. As well known, organoamines react with carbon dioxide to form ammonium bicarbonates and ammonium carbonates. As is also well known, metal hydroxides react with carbon dioxide to form metal bicarbonates and carbonates; and metal carbonates react with carbon dioxide to form metal bicarbonates. In some embodiments, any one or more of the above carbon dioxide sorbents is excluded. The carbon dioxide sorbent can be present in any suitable concentration in the aqueous solution, e.g., 0.1, 0.2, 0.5, 1, 1.5, 2, 2.5, 3, 4, or 5 M concentration, or a saturated concentration, or a concentration within a range bounded by any two of the foregoing values.

In particular embodiments, the one or more quick-absorbing organoamine sorbent materials are selected from one or more amino acids. Any amino acid, which includes natural and non-natural amino acids, should be capable of functioning as a carbon dioxide sorbent, although some amino acids may function better than others. The amino acid may be an alpha- or beta-amino acid, or a derivative or mimic of an amino acid (e.g., taurine). Some examples of suitable amino acids include glycine, sarcosine, alanine, beta-alanine (3-aminopropanoic acid), valine, leucine, isoleucine, serine, threonine, glutamine, asparagine, glutamic acid, aspartic acid, lysine, histidine, arginine, phenylalanine, tyrosine, proline, and tryptophan, and N-alkyl derivatives, ester derivatives, or salts of any of the foregoing amino acids. In some embodiments, the amino acid is selected from glycine and/or N-alkylglycines, wherein the alkyl group is independently selected from hydrocarbon groups containing 1-6 carbon atoms (e.g., methyl, ethyl, n-propyl, isopropyl, n-butyl, isobutyl, sec-butyl, t-butyl, n-pentyl, isopentyl, n-hexyl, and isohexyl). Some examples of N-alkylglycines include sarcosine (where the N-alkyl group is methyl) and N-methylalanine. Generally, the amino acid or other organoamine should possess at least one NH or $NH_2$ group.

In some embodiments, the gaseous source is contacted intimately with the aqueous solution containing the quick-absorbing carbon dioxide sorbent by use of an air-liquid contact facilitator. The air-liquid contact facilitator functions by increasing the contact surface area between the gaseous source and the aqueous solution. The air-liquid contact facilitator typically achieves this by increasing the surface area of the aqueous solution containing the carbon dioxide sorbent. Numerous methods are available for increasing the surface area of an aqueous solution, all of which are considered herein. The air-liquid contact facilitator may increase the solution surface area by, for example, spreading the solution onto an absorbent material (e.g., a wick), which the solution spreads into by capillary action. Alternatively, for example, the air-liquid contact facilitator may increase the solution surface area by forming a mist (i.e., aerosol) of the solution. In some embodiments, the surface area of the gas may be increased to increase the contact surface area between the gas and the solution. For example, the gaseous source may be bubbled through the sorbent solution, along with optional agitation (e.g., stirring) of the solution. Regardless of the process used for increasing the surface area of the solution, the result is an increased area of contact between the sorbent-containing solution and the carbon dioxide-containing gaseous source.

In particular embodiments, the air-liquid contact facilitator is a humidifying device that contains a reservoir of the aqueous solution containing the quick-absorbing carbon dioxide sorbent, and the humidifying device increases the surface area of the aqueous solution by wicking the aqueous solution or forming a mist of the aqueous solution. As the reservoir is in contact with the increased surface area part of the solution (e.g., wicked solution or solution mist), the reservoir will accumulate the resulting aqueous-soluble carbonate or bicarbonate salt of the carbon dioxide sorbent over time.

Generally, water and/or other solvent in the aqueous solution is lost over time due to evaporation, and this gradually increases the concentration of the carbon dioxide sorbent. This occurs at a faster rate when an air-liquid contact facilitator is used. Thus, to maintain a precise or approximate concentration of the carbon dioxide sorbent over time, a feature may be included whereby an amount of water and/or other solvent is added over time to precisely or approximately replenish the amount of water and/or other solvent that has been lost over the same period of time.

In some embodiments, the carbon dioxide sorbent directly reacting with $CO_2$ is an amine-containing sorbent, such as any of the amine-containing materials described earlier above (e.g., an organoamine, iminoguanidine, or bis-iminoguanidine). However, in typical embodiments, as described above, an initial quick-absorbing sorbent is used to quickly capture $CO_2$ in its carbonate or bicarbonate form followed by complexation of the carbonate or bicarbonate with a carbonate/bicarbonate complexing compound, such as an iminoguanidine or bis-iminoguanidine. For example, carbon dioxide may be absorbed by a quick-absorbing carbon dioxide sorbent (e.g., a hydroxide, carbonate, or amino acid) to initially form an aqueous-soluble carbonate or bicarbonate salt in step (i) in aqueous solution. The aqueous solution from step (i) is then contacted with a carbonate/bicarbonate complexing compound, which is different from the carbon dioxide sorbent and may have a bis-iminoguanidine ("BIG") structure according to Formula (1), as provided above. The foregoing contacting step can herein be referred to as a second step, i.e., step (ii). The term "contacting" refers to contact on a molecular level. The term "carbonate/bicarbonate complexing compound" refers to the ability of the bis-iminoguanidine compound to complex with the carbonate or bicarbonate anion and form a precipitate salt (i.e., aqueous-insoluble salt) with the carbonate or bicarbonate anion.

When the carbonate/bicarbonate complexing compound (i.e., amine-containing sorbent) forms the insoluble carbonate or bicarbonate salt, it simultaneously regenerates the quick-absorbing carbon dioxide sorbent (e.g., a hydroxide, carbonate, or amino acid) by abstracting protons from the quick-absorbing carbon dioxide sorbent in the aqueous-soluble salt. By this process, the bis-iminoguanidinium ($BIGH_2^+$) salt structure is formed according to Formula (1a), as provided above. Any suitable method for intimately (molecularly) contacting the carbonate/bicarbonate complexing compound with the aqueous solution is considered herein. For example, in some embodiments, the carbonate/bicarbonate complexing compound is added to the aqueous solution directly as a solid, at which time the carbonate/bicarbonate complexing compound at least partially dissolves into the aqueous solution before precipitating as an insoluble carbonate or bicarbonate salt. In other embodiments, the carbonate/bicarbonate complexing compound is added as a pre-made aqueous solution or suspension to the aqueous solution containing the aqueous-soluble carbonate or bicarbonate salt. In some embodiments, the precipitated bis-iminoguanidinium salt is crystalline (e.g., monocrystalline or polycrystalline), while in other embodiments, the salt is amorphous.

The bis-iminoguanidine compound that herein functions as a carbonate/bicarbonate complexing compound in step (ii) may have a structure within the scope of the following generic structure:

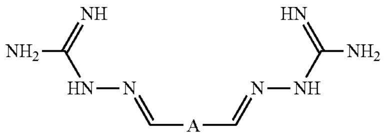

(3)

As further discussed below, the variable A may be a bond or a hydrocarbon group, typically a ring-containing moiety. Although Formula (3) depicts a specific tautomeric arrangement, Formula (3) is intended to include any other tautomers that can be derived from or interconvert with the tautomer shown in Formula (3). As well known, tautomeric structures have the same atomic connections (aside from one or more protons) but differ in the placement of double bonds, generally with concomitant relocation of one or more protons. In some embodiments, the structure of Formula (3) or a sub-generic structure thereof represents an amine-containing sorbent in place of Formula (1).

Some examples of tautomers of Formula (3) are provided as follows:

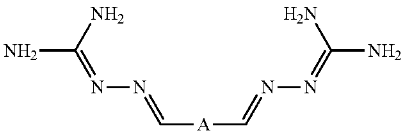

(3-1)

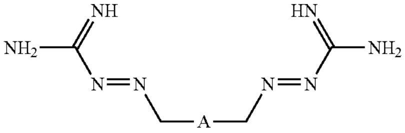

(3-2)

In a first embodiment, the variable A in Formula (3) is a bond. In that case, the compound under Formula (3) can correspond to the following exemplary structures (along with optional replacement of one, two, or more hydrogen atoms with an equivalent number of methyl groups):

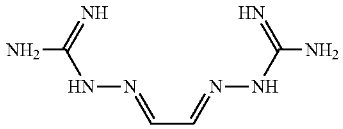

(3-3)

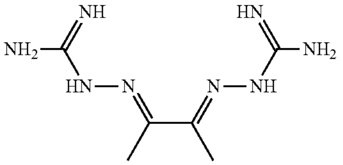

(3-3')

In a second set of embodiments, the variable A is a ring-containing moiety. The ring-containing moiety may be or include a ring (i.e., a cyclic group). The ring-containing moiety (A) is or includes any cyclic group that includes precisely or at least one, two, three, four, five, or six carbon ring atoms. Since the cyclic group is attached to two iminoguanidine groups, the cyclic group in the ring-containing moiety (A) necessarily includes two sites engaged in bonds, either directly, or indirectly via a linker, to the iminoguanidine groups. Typically, the two sites in the ring (A) linked, directly or indirectly, to the iminoguanidine groups are ring carbon atoms. In some embodiments, the ring-containing moiety is or includes a monocyclic ring, i.e., a single ring not bound or fused to another ring. In other embodiments, the ring-containing moiety is or includes a ring system, wherein the term "ring system" refers to a polycyclic moiety (e.g., a bicyclic or tricyclic moiety). The cyclic group can be polycyclic by either possessing a bond between at least two rings or a shared (i.e., fused) bond between at least two rings. The one or more rings in the ring-containing moiety is typically a five-membered, six-membered, or seven-membered ring.

In one set of embodiments, the ring-containing moiety (A) is or includes a carbocyclic ring or ring system. The term "carbocyclic" indicates that the ring or ring system contains only carbon ring atoms. The carbocyclic ring or ring system can be saturated or unsaturated. Some examples of carbocyclic rings that are monocyclic and saturated include cyclopentyl, cyclohexyl, and cycloheptyl rings. Some examples of carbocyclic rings that are monocyclic and unsaturated (which may be aliphatic or aromatic) include cyclopentenyl, cyclopentadienyl, cyclohexenyl, cyclohexadienyl, cycloheptenyl, cycloheptadienyl, and phenylene (benzene) rings. Some examples of carbocyclic rings that are polycyclic and saturated include decalin, norbornane, bicyclohexane, and 1,2-dicyclohexylethane ring systems. Some examples of carbocyclic rings that are polycyclic and unsaturated include naphthalene, anthracene, phenanthrene, phenalene, and indene ring systems.

In another set of embodiments, the ring-containing moiety (A) is or includes a heterocyclic ring or ring system. The term "heterocyclic" indicates that the ring or ring system contains at least one ring heteroatom. The ring heteroatom is typically selected from nitrogen, oxygen, and sulfur. The heterocyclic ring or ring system can be saturated or unsaturated. Some examples of heterocyclic saturated rings or ring systems include those containing at least one ring nitrogen atom (e.g., pyrrolidine, piperidine, piperazine, imidazolidine, azepane, and decahydroquinoline rings); those containing at least one ring oxygen atom (e.g., oxetane, tetrahydrofuran, tetrahydropyran, 1,4-dioxane, 1,3-dioxane, and 1,3-dioxepane rings); those containing at least one ring sulfur atom (e.g., tetrahydrothiophene, tetrahydrothiopyran, 1,4-dithiane, 1,3-dithiane, and 1,3-dithiolane rings); those containing at least one ring oxygen atom and at least one ring nitrogen atom (e.g., morpholine and oxazolidine rings); and those containing at least one ring nitrogen atom and at least one ring sulfur atom (e.g., thiazolidine and thiamorpholine rings). Some examples of heterocyclic unsaturated rings or ring systems include those containing at least one ring nitrogen atom (e.g., pyrrole, imidazole, pyrazole, pyridine, pyrazine, pyrimidine, 1,3,5-triazine, azepine, diazepine, indole, purine, benzimidazole, indazole, 2,2'-bipyridine, quinoline, isoquinoline, phenanthroline, 1,4,5,6-tetrahydropyrimidine, 1,2,3,6-tetrahydropyridine, 1,2,3,4-tetrahydroquinoline, quinoxaline, quinazoline, pyridazine, cinnoline, and 1,8-naphthyridine rings); those containing at least one ring oxygen atom (e.g., furan, pyran, 1,4-dioxin, benzofuran, dibenzofuran, and dibenzodioxin); those containing at least one ring sulfur atom (e.g., thiophene, thianaphthene, benzothiophene, thiochroman, and thiochromene rings); those containing at least one ring oxygen atom and at least one ring nitrogen atom (e.g., oxazole, isoxazole, benzoxazole, benzisoxazole, oxazoline, 1,2,5-oxadiazole (furazan), and 1,3,4-oxadiazole rings); and those containing at least one ring nitrogen atom and at least one ring sulfur atom (e.g., thiazole, isothiazole, benzothiazole, benzoisothiazole, thiazoline, and 1,3,4-thiadiazole rings).

In the event that the variable A is a ring, Formula (3) and sub-formulas thereof are intended to include any regioisomers that may differ in the connection points of the two iminoguanidine groups on the ring-containing moiety (A). Thus, as an example, if A is taken as a benzene (phenylene) ring, the two shown iminoguanidine groups may be located at the 1,4 (para), 1,3 (meta) or 1,2 (ortho) positions. In some embodiments, the iminoguanidine groups are located the farthest from each other on the ring-containing moiety. In the case of a benzene ring, the farthest positions correspond to the 1,4 (para) positions. In the event that the structure according to Formula (3) possesses one or more stereocenters, Formula (3) is intended to include all resulting stereoisomers. The stereoisomer may include one or more enantiomers and/or diastereomers.

Some examples of compounds according to Formula (3) in which A is a ring-containing moiety include the following:

(3-4)

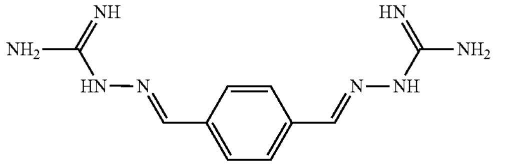

(3-5)

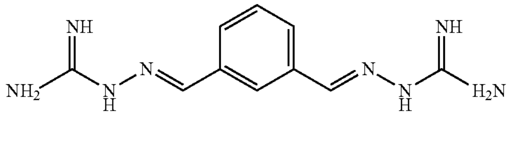

-continued (3-6)

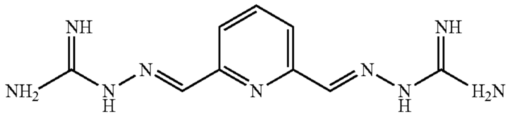

(3-7)

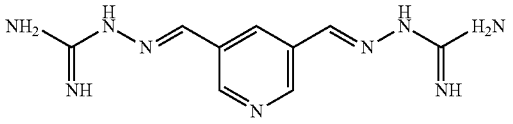

(3-8)

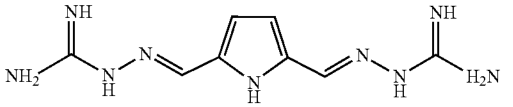

(3-9)

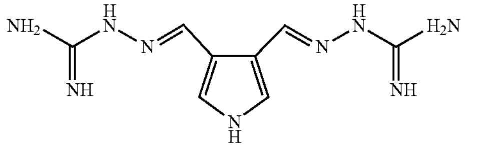

(3-10)

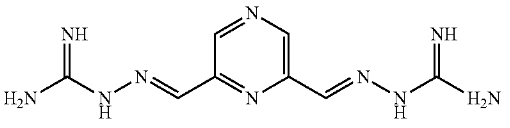

(3-11)

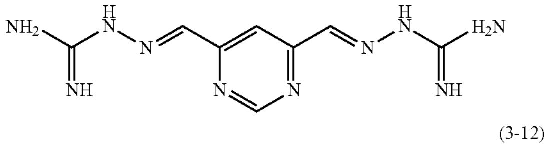

(3-12)

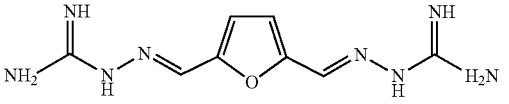

(3-13)

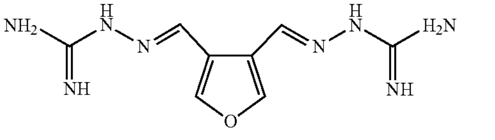

(3-14)

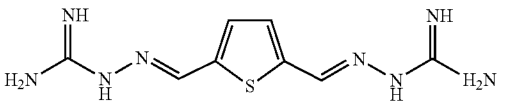

(3-15)

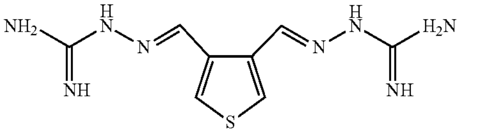

In step (ii), when the bis-iminoguanidine molecule according to Formula (3) or sub-formula thereof contacts the aqueous solution from step (i), an aqueous-insoluble salt forms, which includes a mono-protonated (mono-cationic) or di-protonated (bi-cationic) form of the bis-iminoguanidine molecule complexed with carbonate or bicarbonate. At the same time, the quick-absorbing carbon dioxide sorbent (e.g., hydroxide, carbonate, or amino acid) is regenerated, as discussed above.

In the case of the di-protonated form of the bis-iminoguanidine molecule, the salt (ion pair bond) form of Formula (3) can be expressed by the following generic structure:

(3a)

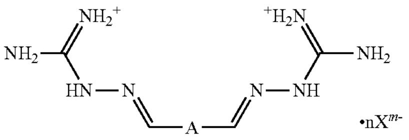

In the case of the mono-protonated form of the bis-iminoguanidine molecule, the salt (ion pair bond) form of Formula (1) can be expressed by the following generic structure:

(3a')

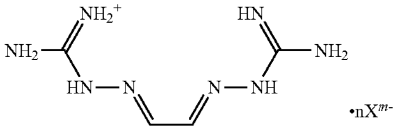

As the structure in Formula (3a) or (3a') derives directly from Formula (1) or (3), it is understood that Formula (3a) or (3a'), like Formula (3), includes all possible tautomers, regioisomers, and stereoisomers described above for Formula (1) or (3). Thus, the positive charge shown in Formula (3a) or (3a') may be located on any of the other nitrogen atoms through tautomerizaton. As well known in the case of tautomers, the positive charge is generally distributed among all atoms capable of holding a positive charge in the various tautomers. Likewise, it is well known that partial double bond character is generally present among all of the bonds capable of engaging in double bonds in the various tautomers. Moreover, the structures in Formulas (3), (3a), and (3a') include the possibility of one or more of the hydrogen atoms in Formula (3), (3a), or (3a'), whether the hydrogen atoms are shown or not shown in the formula, being replaced with one or more methyl groups, respectively.

In Formula (3a) or (3a'), $X^{m-}$ is a carbonate or bicarbonate anion, with m being 1 for bicarbonate and 2 for carbonate. In the case of the bis-iminoguanidine molecule being di-protonated, the variable n is an integer of 1 or 2, provided that n multiplied by m is 2 (i.e., n×m=2) to counterbalance the +2 charge of the di-protonated bis-iminoguanidinium species. In the case of the bis-iminoguanidine molecule being mono-protonated, the variable n is 0.5 or 1, provided that n multiplied by m is 1 (i.e., n×m=1) to counterbalance the +1 charge of the mono-protonated bis-iminoguanidinium species.

When the variable A in Formula (3) is a bond, the variable A in Formula (3a) or (3a') will necessarily also be a bond. In that case, the compound under Formula (3a) has the following structure:

(3a-1)

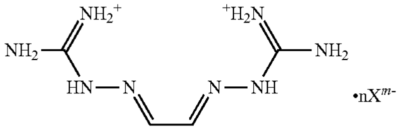

When the variable A in Formula (3) is a ring-containing moiety, the variable A in Formula (3a) or (3a') will necessarily also be the same ring-containing moiety. Some examples of compounds according to Formula (3a) include the following:

(3a-2)

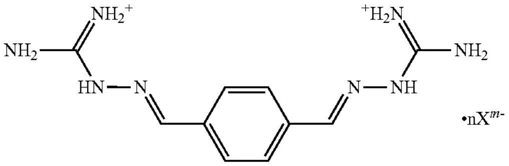

(3a-3)

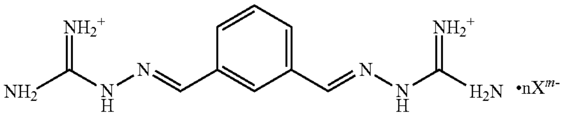

(3a-4)

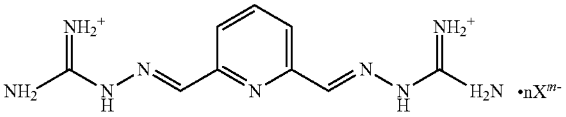

(3a-5)

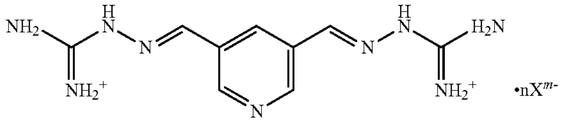

(3a-6)

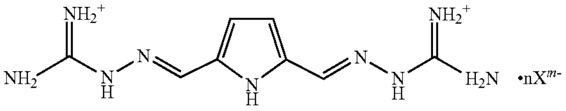

(3a-7)

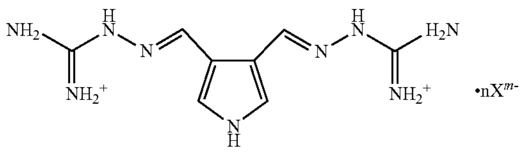

(3a-8)

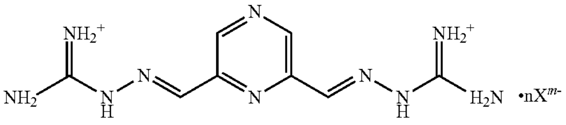

(3a-9)

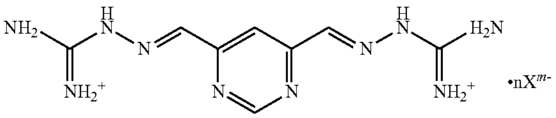

-continued (3a-10)

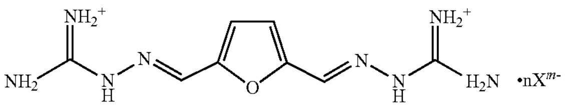

(3a-11)

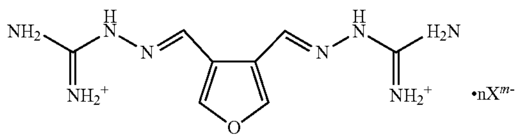

(3a-12)

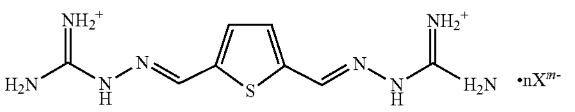

(3a-13)

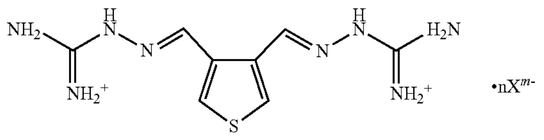

As further discussed below, any of the above exemplary compounds under Formula (3a) or (3a') may be converted to the respective neutral analogue according to Formula (3) by removal of the one or two protons located on the one or two positively charged amine groups. Moreover, in compounds under Formula (3), (3a), or (3a') where A is a ring containing an —NH— group in the ring, the hydrogen atom on the ring nitrogen atom may (optionally) be replaced with a hydrocarbon group, such as a methyl, ethyl, n-propyl, isopropyl, n-butyl, isobutyl, sec-butyl, t-butyl, phenyl, or benzyl group.

As also provided above, one or more of the hydrogen atoms in any of the above exemplary structures, whether the hydrogen atoms are shown or not shown, may be replaced with one, two, or more methyl groups, respectively. In the event of one or more hydrogen atoms being replaced with a methyl or other hydrocarbon group, the substitution in the structure of neutral compounds under Formula (3) should not result in substantial insolubility of the neutral compound in the aqueous solution containing the sorbent. If necessary, the aqueous solution may be heated to a mild temperature (e.g., 40 or 50° C.) to aid in solubilization of the neutral compound. An aqueous-soluble organic solvent may also be added to improve the solubility of the neutral compound.

After the carbonate or bicarbonate salt is precipitated from the aqueous solution in step (ii), the precipitate is removed (separated) from the aqueous solution to result in a solid form of the carbonate or bicarbonate salt precipitated from step (ii). The foregoing salt removal step may herein be referred to as the third step, i.e., step (iii). Generally, the precipitated salt is filtered from the solution. If desired, the isolated salt may be rinsed and/or dried. The filtered solution may be re-used, since it contains the regenerated quick-absorbing carbon dioxide sorbent.

The compounds according to Formula (1) or (3) can be synthesized by methods well known in the art. In particular embodiments, a compound according to Formula (1) or (3) is synthesized by reacting aminoguanidine (or a methylated derivative thereof) with a ring-containing dialdehyde or diketone under conditions where an imine linkage is formed between an amino group on the aminoguanidine and the carbon of the aldehyde or ketone group. The ring-containing dialdehyde or diketone includes a ring-containing moiety (A), as described above. A general schematic of the process is provided as follows:

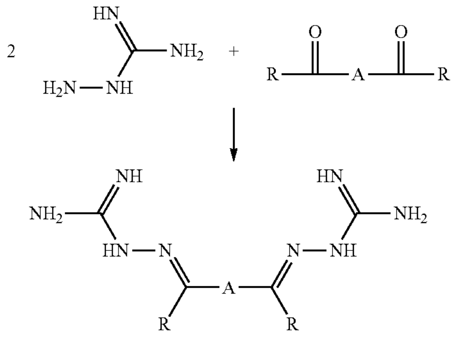

In the above scheme, A is a ring-containing moiety, as described above. The group R is typically hydrogen (which corresponds to a dialdehyde reactant), but R may be a hydrocarbon group, particularly a hydrocarbon group containing 1-6, 1-7, or 1-8 carbon atoms, such as methyl, ethyl, n-propyl, isopropyl, n-butyl, isobutyl, sec-butyl, t-butyl, phenyl, or benzyl group, which corresponds to a diketone reactant. The above scheme is for directly producing a neutral bis-iminoguanidine compound according to Formula (1) or (3). Alternatively, by reacting the aldehyde or ketone with a guanidinium compound, a guanidinium salt can be produced and converted to the neutral guanidine compound by reaction with a base. Moreover, any one or more hydrogen atoms of the aminoguanidine or aminoguanidinium reactant may be replaced with one or more methyl groups, respectively, except that the aminoguanidine or aminoguanidinium reactant should retain at least one primary amine group for reaction with the dialdehyde or diketone. Alternatively, one or more hydrogen atoms of the bis-iminoguanidinium or bis-iminoguanidine product may be replaced with one or more methyl groups by, for example, reaction with methyl iodide.

Examples have been set forth below for the purpose of illustration and to describe certain specific embodiments of the invention. However, the scope of this invention is not to be in any way limited by the examples set forth herein.

EXAMPLES

Overview

The following experiments evaluated microwave heating as a method to increase the regeneration rate of solid carbonate sorbents and reduce the energy consumption compared to conventional, conductive, thermal regeneration processes. As a proof-of-principle, the present experiments investigated regeneration of solid bis(iminoguanidines) (BIGs), such as methylglyoxal-bis (iminoguanidine) (MGBIG), using microwaves at 2.54 GHz frequency. The electrical energy consumption of the microwave oven was compared with that of a conventional oven to provide a better understanding of the practical benefits of microwave regeneration. The present process takes advantage of the water molecules included in the MGBIG crystals, which provides a path for localized heating of the $CO_2$-binding molecules (i.e., carbonate-water complexes), thereby resulting in ultrafast, effective and energy efficient regeneration (FIG. 1).

EXPERIMENTAL

Figure 2:
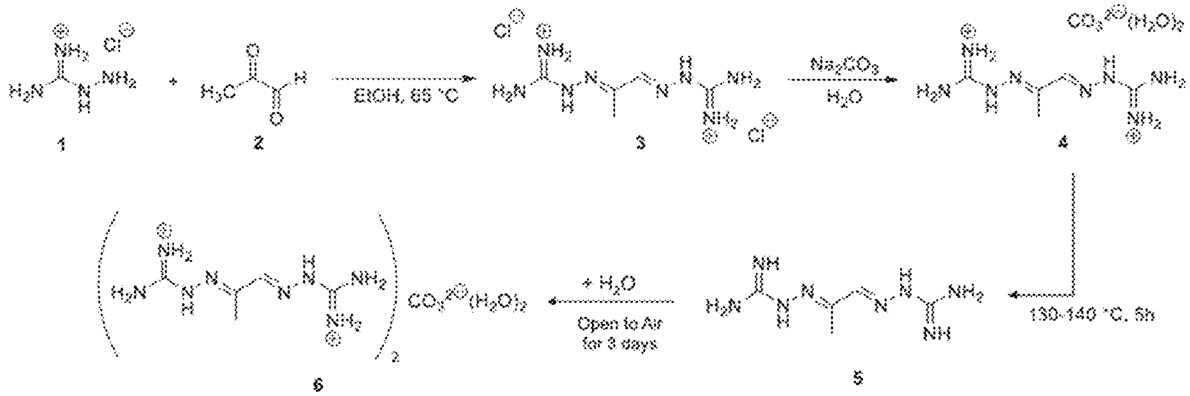
FIG. 2. Scheme showing synthesis of crystalline MGBIG carbonate solids (4=Ph3; 6=Ph1), where Ph1=phase 1 and Ph3=phase 3.

Carbonate Synthesis: Commercially available reagents were commercially obtained and were used without further purification. MGBIG chloride (Compound 3 in FIG. 2) was synthesized based on a previously published procedure (D. Stamberga et al., *MRS Adv.* 7(19), 399-403, 2022) by adding aminoguanidine hydrochloride (1) (225.5 g, 2.04 mol) and absolute ethanol (900 mL) in a 2-L round bottom flask equipped with a rare earth stir bar. The flask was placed in a heating block, and the suspension was stirred. An aqueous solution of methylglyoxal (40%) (2) (172 mL, 1.00 mol) was added to the suspension and the flask was connected to a condenser. The reaction mixture was heated at 70° C. for 4 hrs. Subsequently, the flask was placed in an ice bath and left overnight. The mixture was then vacuum filtered to recover the product formed as a white solid suspension. The collected solid was washed with ethanol (2×100 mL) followed by diethyl ether (3×100 mL) to yield a white solid (231.9 g, 90%).

MGBIG carbonate Phase 3 (Ph3) (4) was synthesized by dissolving MGBIG chloride (3) (231.9 g, 0.91 mol) in DI water (1.67 L). The solution was mechanically stirred at 300 rpm using a PTFE stirring blade fitted to a stirring shaft in a 4 L plastic beaker. 2.37 M $Na_2CO_3$ (0.76 L) solution was added, resulting in the formation of a pale-yellow slurry. The mixture was mechanically stirred for 2 h, then the slurry was vacuum filtered and dried in air for 2 days to yield pale-yellow solids (220.9 g, 86%). Total Inorganic Carbon Analysis confirmed that the product is MGBIG carbonate Phase 3: theoretical % C for $(MGBIGH_2^{2+})(CO_3^{2-})$ $(H_2O)_2$, $(C_6H_{18}N_8O_5)$ % C=4.2532; experimental % C=4.2115. MGBIG (5) is obtained by placing MGBIG carbonate (4) in a vacuum oven at 130-140° C. for 5 h to yield a pale-yellow solid (137.8 g, 95%) [$^1$H NMR (DMSO-d6, 400 MHz): 7.63 (s, 1H), 5.74-5.42 (m, 8H), 2.00 (s, 3H)]. MGBIG carbonate Phase 1 (6) is obtained by dissolving MGBIG (5) (18.42 g, 0.1 mol) in DI water (200 mL). The solution was left open to air for 2-3 weeks. The formed crystals were removed by vacuum filtration, washed with water (2×20 mL) and left to dry overnight to yield orange crystals (6.84 g, 29%). Total Inorganic Carbon Analysis confirmed that the product is MGBIG carbonate Phase 1 with theoretical % C of $(MGBIGH^+)_2(CO_3^{2-})(H_2O)_2$ $(C_{11}H_{30}N_{16}O_5)$ % C=2.5737, and experimental % C=2.5462.

Sorbent Regeneration: $CO_2$ loaded absorbents (i.e., MGBIG carbonate Ph1 and Ph3) were regenerated by microwave heating using a conventional microwave oven (Panasonic® NN-SN736W 1.6 Cu. Ft.). The maximum input power of the oven was 1250 W. The power was adjustable at 10 different levels. All powder samples were inserted in glass vials (e.g., 5 mL, 30 mL, and 100 mL). The sample vial without the lid was placed in the middle of the microwave chamber and heated by microwave irradiation for a certain period of time. After the irradiation period, the weight of the sample was measured immediately and then the vial was tightly closed to secure the sample for further analysis. Conductive heating was also performed by heating the sample vials in a conventional oven (65 L) for the purpose of comparing results of microwave regeneration to those of regeneration by conventional heating.

Materials Characterization: The CM140-01 Total Inorganic Carbon Analyzer consisting of CM5330 Acidification Module and CM5017 CO2 Coulometer Module was used to determine inorganic carbon content in solid samples. Air at 100 mL/min was used as the carrier gas, and calculations were based on sample weight. 1 M $Na_2CO_3$ solution was used as a standard. Pre-fined solid samples (40-60 mg) were weighted out into small Teflon cups, and the entire cup was transferred into a 15-mL sample flask. A volume of 5 mL of 2 M HCl acid was dispensed to acidify each sample. Solid samples were analyzed in duplicate.

Scanning electron microscopy (SEM) and energy-dispersive X-ray spectroscopy (EDS) were carried out using a commercial field emission scanning electron microanalyzer. X-ray diffraction (XRD) measurements were conducted using a PANalytical™ X' Pert Pro MPD equipped with an X' Celerator solid-state detector. For the XRD measurements, X-rays were generated at 45 kV/40 mA, and the X-ray beam wavelength was $\lambda$=1.5406 Å (Cu K$\alpha$ radiation). A watt meter (P3 P4400 Kill A Watt Electricity Usage Monitor) was used to directly measure energy consumption.

Thermogravimetric analysis (TGA) and differential scanning calorimetry (DSC) were also performed. A commercial thermal analysis instrument that measures both heat flow and mass change of a sample as a function of temperature and time was used. Samples were placed in an insulated and isolated chamber, and any changes to the mass and heat flow of the sample could be attributed to chemical reactions taking place due to the increase in temperature. The total enthalpy of regeneration can be estimated by finding the area between the baseline curve and the heat flow curve. Samples were heated between 70° C. and 140° C. with a temperature ramp of 5° C. per minute. A 10-minute isothermal period before and after the temperature ramp was allowed to ensure that the samples were at equilibrium. FTIR was used to analyze the composition and onset of $CO_2$ in the gases generated during the thermal regeneration of MGBIG in the thermal analysis instrument. Different chemical bonds, and therefore different chemical species, absorb IR waves at unique wavelengths. Based on the characteristic wavelengths of IR absorption of certain chemical bonds, chemical species that were evolved during the thermal regeneration of MGBIG could be identified. The gas generated by the thermal analysis instrument was analyzed using FTIR every 13 s, and $N_2$ was used as an inert carrier gas. Background readings were taken before the DSC/TGA experiment was started.

Results and Discussion

µ-wave Regeneration: Among various BIG structures, MGBIG was found to be a promising DAC sorbent, functioning by dissolution of the BIG solids and recrystallization into carbonate salts upon absorption of $CO_2$ from ambient air. Depending on concentrations in the solution, the soluble MGBIG was crystallized into three carbonate phases after $CO_2$ absorption, as follows:

1) Phase 1:

$$(MGBIGH^+)_2(CO_3^{2-})(H_2O)_2 \text{ at } > 1M$$

2) Phase 2:

$$(MGBIGH^+)_2(MGBIGH_2^{2+})(CO_3^{2-})_2(H_2O)_6 \text{ at } > 0.75M$$

3) Phase 3:

$$(MGBIGH_2^{2+})(CO_3^{2-})(H_2O)_2 \text{ at } < 0.3M$$

Carbonate crystals of MGBIG (C-MGBIG) Phase 1 and Phase 3 were investigated to evaluate the feasibility of microwave regeneration. In Phase 1 (Ph1), one MGBIG molecule binds with 0.5 molecules of $CO_2$, while one MGBIG molecule binds with 1 molecule of $CO_2$ in Phase 3 (Ph3).

Figures 3A, 3B, 3C, 3D, 3E, 3F:
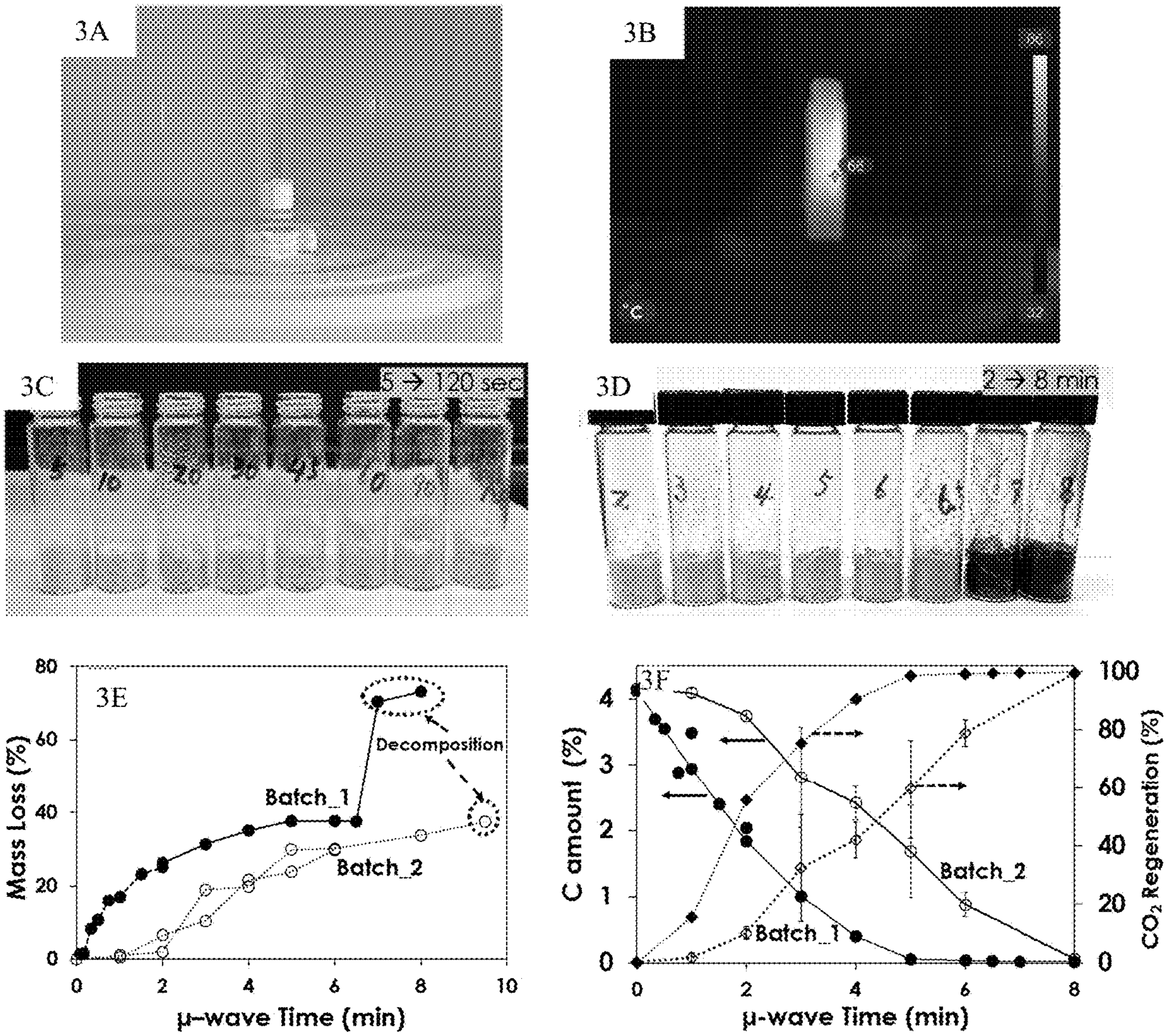
FIGS. 3A-3F. Microwave regeneration of C-MGBIG.

Microwave radiation was found to effectively heat up the C-MGBIG solid. FIG. 3 shows that 1 g of C-MGBIG_Ph3 solid (Batch 1) in a glass vial was heated with microwaves of 2.54 GHZ at 100% full power (i.e., 1,674 W used by the microwave oven) for 30 s (FIGS. 3A and 3B). From FIG. 3B, it appears that the temperature at the upper part of the glass vial was higher than the temperature at the bottom where solid particles were located. The thermal behavior can be associated with the water vapor leaving the solid C-MGBIG and condensing on the glass. After 20 s, water condensation was observed at the wall of the glass vial (FIG. 3C), indicating that microwave radiation effectively heats up the C-MGBIG crystals, and $CO_2$ and $H_2O$ are desorbed out from the crystalline material. The mass loss associated with $CO_2$ and $H_2O$ evaporation increased with the microwave time and reached a steady-state at 5 min, corresponding to full regeneration. After 7 min, the overheated sample decomposed, resulting in significant mass loss (FIGS. 3D and 3E). The corresponding carbon analysis in the regenerated C-MGBIG solids, as shown in FIG. 3F, indicates full regeneration occurs after 5 min, which corresponds to 34 wt % mass loss. A second batch (Batch 2) of C-MGBIG_Ph3 was tested to investigate reproducibility. In FIG. 3F, it appears that the desorption kinetics of Batch 2 is relatively slower than in Batch 1, which is associated with the different crystalline morphology generated during sample preparation.

Figures 4A, 4B, 4C, 4D, 4E, 4F:
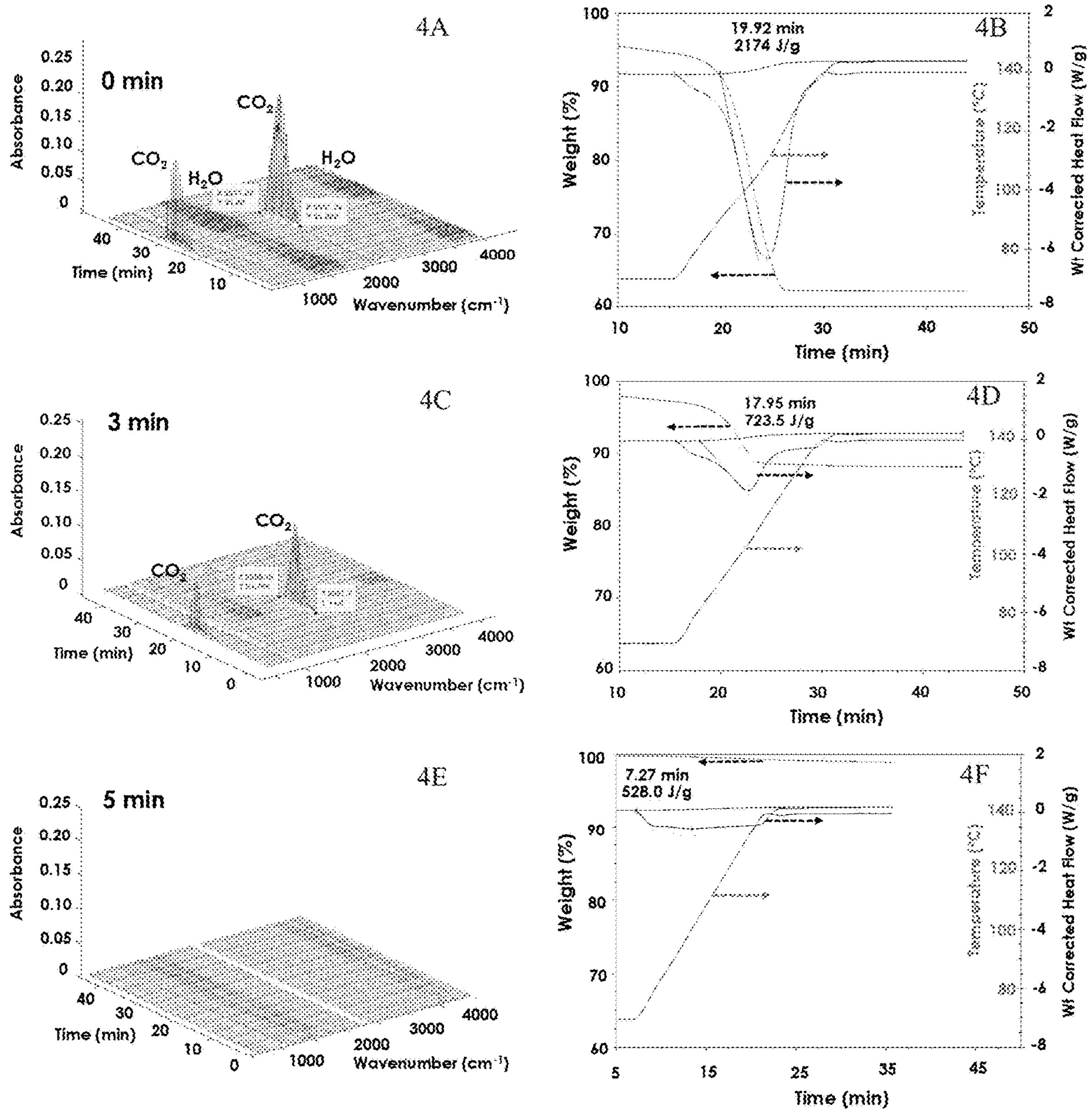
FIGS. 4A-4F. FTIR-DSC/TGA analysis of C-MGBIG Phase 3.

FIG. 4A shows FTIR spectra during regeneration of C-MGBIG at 0 min. The peak at around 2500 $cm^{-1}$ corresponds to $CO_2$ and the peaks at approximately 1500 $cm^{-1}$ and 4000 $cm^{-1}$ correspond to water vapor. FIG. 4B is a graph showing DSC/TGA data during regeneration of C-MGBIG at 0-min microwave irradiation. The curve in green corresponds to the TGA analysis, the curve in black depicts the reaction temperature, and the curve in blue corresponds to the heat flow to the sample. FIG. 4C shows FTIR spectra during regeneration of C-MGBIG at 3-min microwave irradiation. FIG. 4D is a graph showing DSC/TGA data during regeneration of C-MGBIG at 3-min microwave irradiation. FIG. 4E shows FTIR spectra during regeneration of C-MGBIG at 5-min microwave irradiation. FIG. 4F is a graph showing DSC/TGA data during regeneration of C-MGBIG at 5-min microwave irradiation.

The $CO_2$—$H_2O$ desorption features of microwave regenerated C-MGBIG were analyzed by in-situ TGA-DSC-FTIR, as shown in FIGS. 4A-4F. In-situ FTIR was used to analyze the exhaust gases from decomposing samples during the TGA-DSC measurements. FIGS. 4A-4F illustrate the in-situ FTIR-DSC analysis for C-MGBIG_Ph3. For the initial C-MGBIG_Ph3 at 0 min microwave irradiation, significant $CO_2$ and $H_2O$ peaks, assigned at 1500 and 2500 $cm^{-1}$, respectively, arise with the mass losses around 20 min, which corresponds to 80° C. The peaks reached a maximum and then decreased over time. No peaks were found after 40 min, corresponding to annealing temperature to 140° C. The final ~38% mass loss agrees well with the mass loss of full regeneration (e.g., 34-36 wt %). The peak intensity of the 3 min microwaved sample at 2500 $cm^{-1}$, as shown in FIG. 4C, significantly decreased to 0.1, compared to 0.2 of the 0 min microwaved sample. The mass loss reached ~10%, which is much smaller than ~38% loss from the pristine C-MGBIG sample. No FTIR peaks and significant mass loss were observed in the 5-min microwaved sample. The desorption features are well matched with the bulk mass loss and carbon analysis.

Based on the DSC/TGA results, the regeneration energy of MGBIG carbonates can be determined. The thermal regeneration of MGBIG carbonate (Phase 3) can be described by the following chemical reaction:

$$MGBIGH_2^{2+}\ (CO_3)^{2-}(H_2O)_2 \longrightarrow MGBIG + CO_2 + 3H_2O$$

For every molecule of MGBIG, there are 1 molecule of $CO_2$ and 3 molecules of $H_2O$ that are released during thermal regeneration. Two $H_2O$ molecules are included in the guanidine carbonate crystal whereas the third $H_2O$ molecule is generated from the two protons of the guanidine and one oxygen atom from the carbonate within the crystal structure. This mole ratio of $H_2O$ to $CO_2$ is then used to estimate the $CO_2$ regeneration energy for MGBIG.

Table 1 provides the sample weight, masses of $CO_2$ and water released, and the total regeneration energy of the sample, $H_2O$ evaporation energy, and regeneration energy (in a per-$CO_2$ basis). The regeneration heat of MGBIG carbonate is compared to the regeneration heat of other commonly used solvents/sorbents in Table 2. Monoethanolamine (MEA) is the industry standard solvent used for point-source capture of $CO_2$, and has experimentally been found to have a total regeneration energy requirement between 10.8 GJ/t$CO_2$ and 14.4 GJ/t$CO_2$ (C. Nwaoha et al., *Energy Procedia* 114 (2017) 2039-2046; and C. Nwaoha et al., *Fuel* 234 (2018) 1089-1098). Also, $CaCO_3$ solid sorbent is currently being investigated to be used in industrial scale DAC systems.

TABLE 1

Vaporization and Total Regeneration Enthalpy of MGBIG carbonate Phase 3.

| Time (min) | Sample Weight (mg) | $CO_2$ released (mg) | $H_2O$ released (mg) | Enthalpy (J/g) | Tot. Reg. Energy (J) | $H_2O$ Evp. Energy (J) | Reg. E (kJ/g-$CO_2$) |
|---|---|---|---|---|---|---|---|
| 0 | 15.3 | 2.38 | 2.90 | 1590 | 24.3 | 7.9 | 10.2 |
| 1 | 24.3 | 2.89 | 3.50 | 1300 | 31.6 | 8.3 | 10.9 |
| 2 | 15.5 | 1.14 | 1.40 | 884 | 13.7 | 3.3 | 12.0 |
| 3 | 15.9 | 0.78 | 0.96 | 668 | 10.6 | 2.3 | 13.6 |
| 4 | 12.3 | 0.16 | 0.20 | 391 | 4.80 | 0.5 | 30.0 |
| 5 | 12.3 | — | — | 532 | — | | — |

The experimental inorganic carbon fraction of C-MGBIG_Ph 3 was measured at 4.25 wt. %. The specific heat capacity value for water is assumed as 4.2 J/(g° C.). The sensible heat is calculated between 80° C. and 100° C. The average enthalpy of vaporization of water is 2260 J/g. Water evaporation energy was calculated as follows:

$$H_2O \text{ evaporation } E = \text{Mass of water}^*(\text{Enthalpy of } H_2O \text{ evaporation} + \text{Specific Heat Capacity}^*\Delta T)$$

In Table 1, the experimental inorganic carbon fraction of C-MGBIG_Ph 3 was measured at 4.25 wt %. The specific heat capacity value for water is assumed as 4.2 J/(g° C.). The sensible heat is calculated between 80° C. and 100° C. The average enthalpy of vaporization of water is 2260 J/g. Water evaporation energy was calculated as follows:

H2O evaporation $E$=Mass of water×(Enthalpy of H2O evaporation+Specific Heat Capacity×$\Delta T$).

TABLE 2

Regeneration energy requirements of other commonly used chemicals in $CO_2$ capture.

| Solvent | $Q_{sensible}$ (kJ/g-$CO_2$) | $Q_{vaporization}$ (kJ/g-$CO_2$) | $Q_{reaction}$ (kJ/g-$CO_2$) | $Q_{regeneration}$ (kJ/g-$CO_2$) | Reg. Temp. (° C.) |
|---|---|---|---|---|---|
| 5M MEA (30 wt. %) | 3.41 | 1.26 | 6.15 | 10.8 | 100 |
| 5M MEA | 7.1 | 1.28 | 6.02 | 14.4 | 100 |
| Na-Glycinate (30 wt. %) | 3.2 | 0.9 | 1.6 | 5.7 | 100 |
| $CaCO_3$ | 2.2 | | 4.1 | 6.3 | 900 |
| MGBIG | 1.09 | 2.87 | 6.24 | 10.2 | 80-120 |

Figure 5:
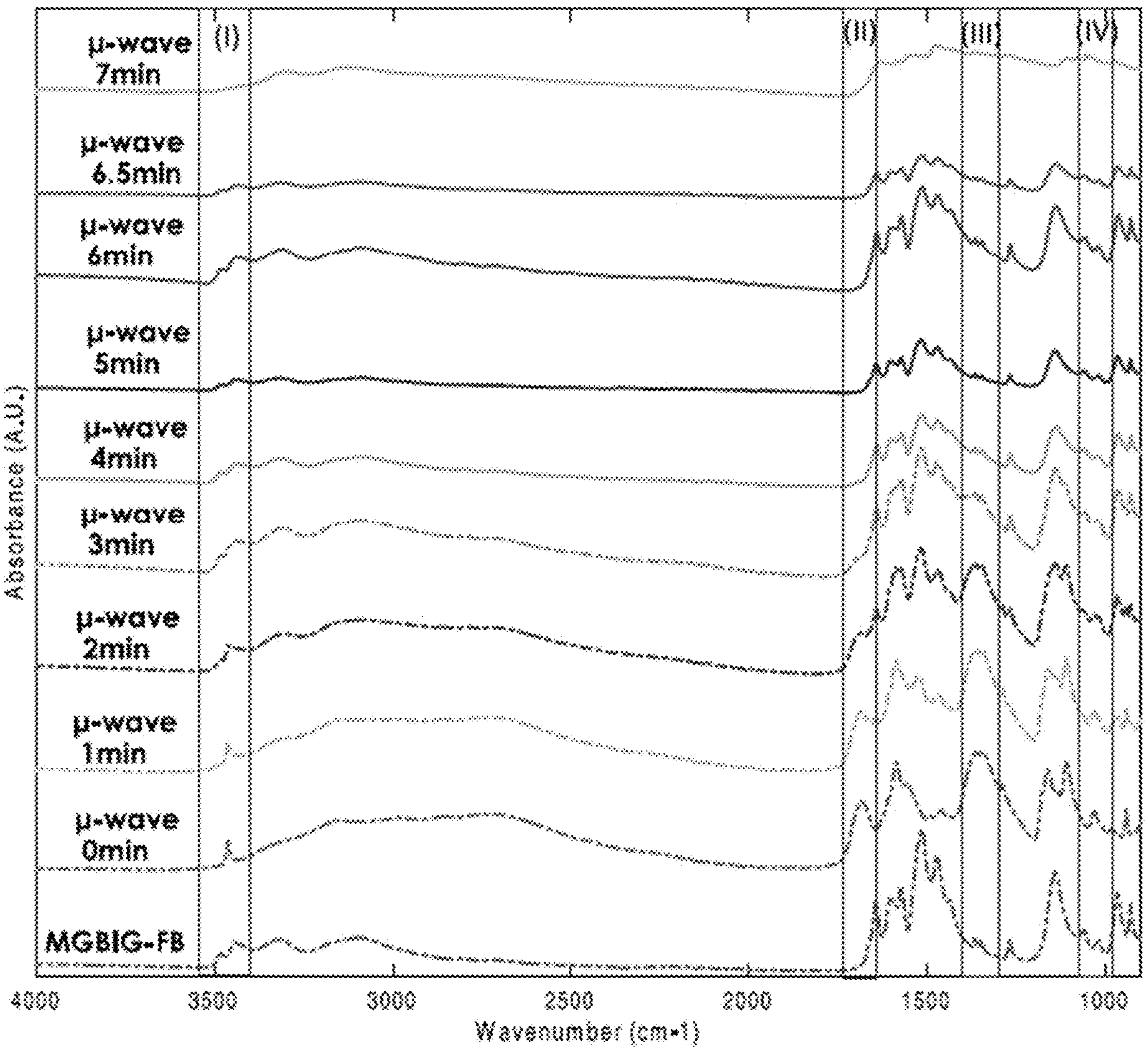
FIG. 5. Graph showing solid-FTIR Analysis of C-MGBIG_Ph3 samples that have been exposed to microwave (μ-wave) radiation for up to 7 min.

Chemistry of Regenerated Solid: FTIR analyses of microwave regenerated C-MGBIG_Ph3 samples were performed to understand how the chemical structure of C-MGBIG changes over microwave heating. The solid-FTIR spectra of C-MGBIG_Ph3 exposed to 0 to 7 min of microwave radiation is shown in FIG. 5. There are four main sets of peaks that have been identified on the FTIR spectra of C-MGBIG_Ph3, as denoted by regions I, II, III, and IV. A sharp peak I, at around 3400 $cm^{-1}$, corresponds to the presence of O—H bonds (i.e., water) found in the crystallized complex of C-MGBIG_Ph3 at 0 min. As the sample is exposed to microwave radiation, $CO_2$ and water are released, thus resulting in decreasing intensity of this peak. After 3 min, the peak disappears and two other peaks arise, which are similar to the feature of MGBIG-FB (i.e., carbonate free-base MGBIG). Peak II, at around 1750 $cm^{-1}$, corresponds to the presence of a C—N bond (imine) that is present in the structure of both C-MGBIG_Ph3, and the MGBIG-FB Peak III and IV, at around 1300 $cm^{-1}$ and 1100 $cm^{-1}$ respectively, corresponds to the C—O bond found in carbonate, and are seen to appear strongly in samples of C-MGBIG_Ph3 that have been exposed to 0 to 3 min of microwave radiation. This peak is not present in samples exposed to microwave radiation for >4 min (including the free base). The intensity of this peak, like that of carbonate, also decreases with time spent exposed to microwave radiation. The similarity in the characteristic FTIR peak of 5 and 6 min to that of MGBIG-FB suggests that MGBIG is regenerated after 5 min of microwave exposure. The lack of peaks I-IV in the characteristic curve of C-MGBIG_Ph3 exposed to 7 min of microwave radiation suggests that the sample has chemically degraded.

Figure 6:
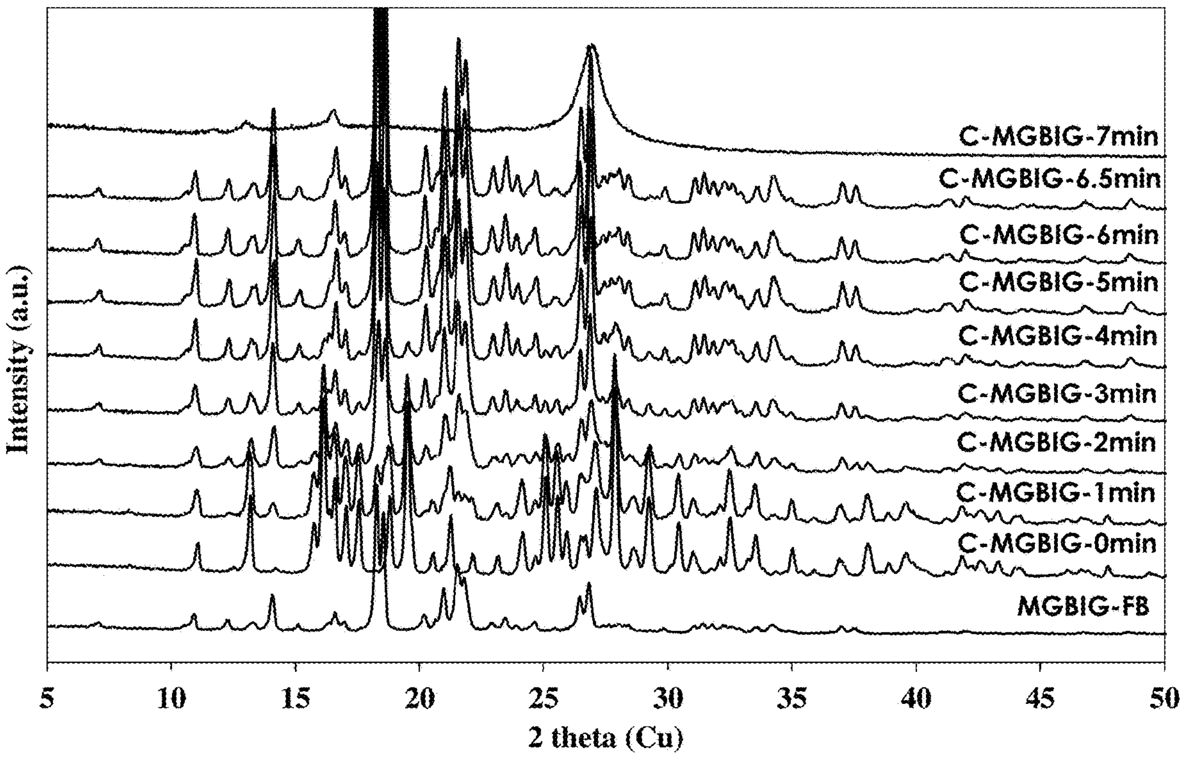
FIG. 6. X-ray diffraction patterns of μ-wave regenerated MGBIG_Ph3 solid (Batch 1).

FIG. 6 shows the corresponding XRD patterns of the microwave regenerated C-MGBIG and MGBIG-FB. The crystalline patterns of C-MGBIG changed over microwave irradiation time. Several peaks at 15-20° and 25-30° disappeared while some new peaks at 20-23° emerged during microwave regeneration. Note that the XRD pattern of the 5-min microwave irradiated, fully regenerated C-MGBIG sample appears to be similar to the XRD pattern of the MGBIG-FB sample. The C-MGBIG 7-min microwave irradiated sample showed different patterns, indicating irreversible chemical decomposition as a result of over-irradiation.

Figures 7A, 7B:
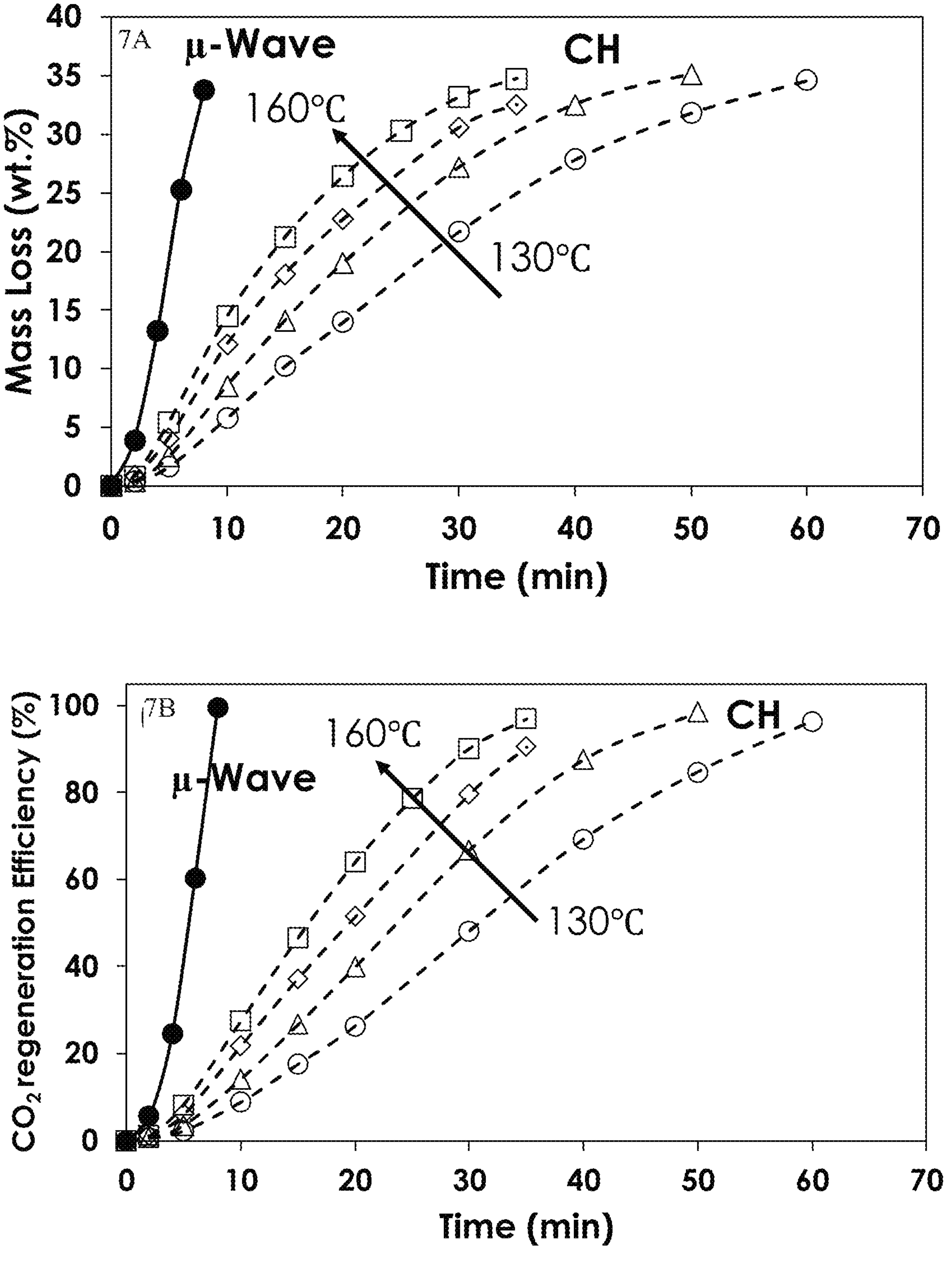
FIGS. 7A-7B. Comparison of regeneration efficiency of MGBIG_Ph3 (1 g) by microwave irradiation or conductive heating (CH): at mass loss (FIG. 7A) and corresponding $CO_2$ regeneration efficiency (FIG. 7B).

Regeneration of MGBIG by microwave heating is 5-10 times faster than by conductive heating. FIG. 7A shows the comparison of mass loss kinetics between microwave and conductive heating of C-MGBIG. The mass change of the sample (i.e., 1 g of C-MGBIG_Ph3) was monitored during regeneration, and the corresponding $CO_2$ regeneration efficiency was determined by a calibration curve (i.e., correlation of mass loss versus carbon amount). Conductive-heating regeneration for C-MGBIG specimens was performed with a conventional oven at various temperatures from 130 to 160° C. As shown in FIG. 7B, the highest conductive-heating rate at 160° C. shows the fastest regeneration rate compared to that at lower temperatures. Note that microwave regeneration led to much faster mass loss kinetics compared to conductive-heating at 160° C. No crystallinity changes were observed after full regeneration of samples by microwave or conductive heating.

Figures 8A, 8B, 8C, 8D:
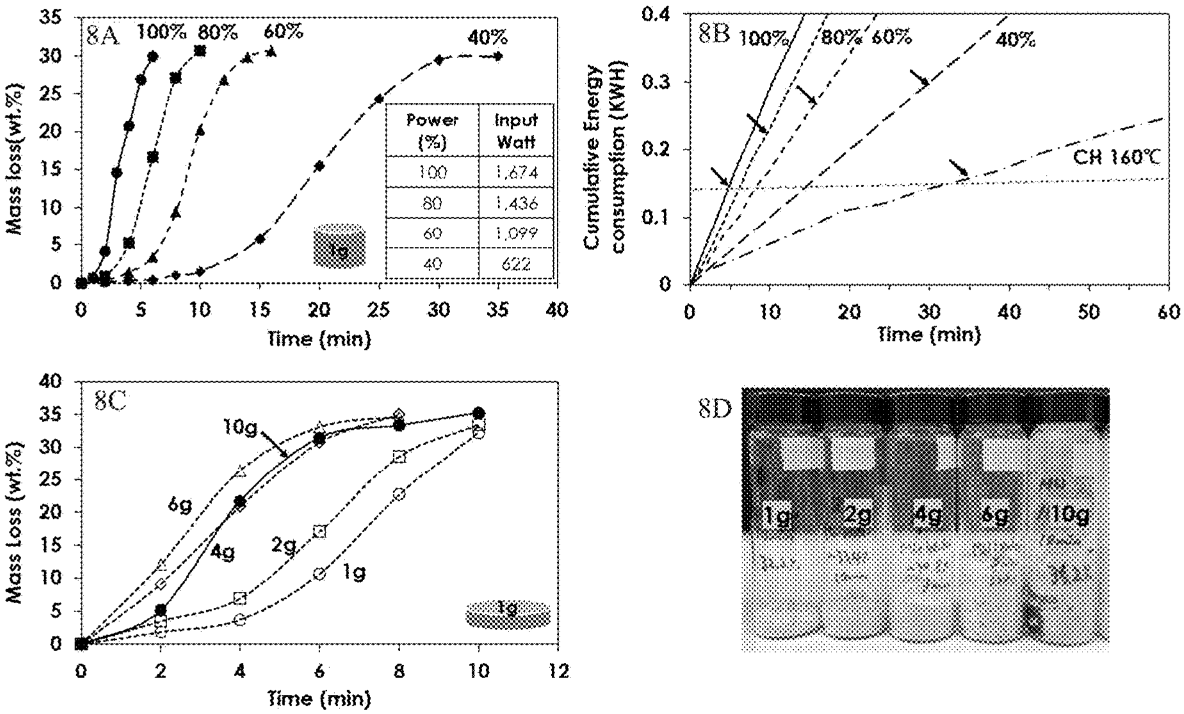
FIGS. 8A-8D.

Microwave heating shows potential benefits for fast, energy-efficient, scalable regeneration. FIG. 8A shows mass loss kinetics of microwave heating as a function of microwave power and sample mass. The electrical energy consumption of a microwave oven for full MGBIG regeneration was compared to that of a traditional convection oven. The cumulative energy consumption in terms of total electrical energy required per unit mass of regenerated sample was directly measured by a watt meter for both ovens. Microwave ovens, in general, are 50-70% efficient at converting electricity into microwaves (S. Lakshmi et al., *J. Food Eng.* 2007, 78 (2), 715-722). For a full power of 1,250 W microwave, the oven requires 1,674 W of electricity including ancillary power requirements (FIG. 8A). The highest power showed the highest mass-loss rate. The cumulative energy consumption of full regeneration was determined by the irradiation time needed for mass loss at >30 wt % (FIG. 8B). The arrows indicate corresponding energy consumption of 1 g C-MGBIG regeneration. Conductive heating at 160° C. requires ~0.14 KWh for full regeneration and shows the lowest energy consumption rate but the longest regeneration time. On the other hand, microwave-heating regeneration at 100% power also requires 0.14 KWh for full regeneration, which suggests that microwave regeneration can compete with conductive heating in terms of total energy required per unit mass of regenerated sample. Thus, a particular benefit from microwave heating is its much higher regeneration rate compared to that of conductive heating.

Microwave regeneration efficiency may also be related to the sample volume. For scalable heating to 10 g, the sample holder was replaced by a 30-mL glass vial of 2 cm diameter, and then, the thickness of MGBIG powder packing decreased from ~1 cm in the 5-mL vial to ~0.3 cm in the 30-mL vial. The full regeneration time of 10 g C-MGBIG was 10 min which is even faster than the regeneration time for 1-2 g of C-MGBIG (FIG. 8C). FIG. 8D is a photo of showing microwave regenerated samples tested to provide data in FIG. 8C. Note that the regeneration rate (i.e., mass loss) increased with the sample mass up to 6 g and then decreased for the 10-g sample. This behavior is likely due to the penetration depth of microwaves. It is assumed that the regeneration behavior is related to the type of material, volume of sample, depth of sample with respect to the penetration depth of microwaves at 2.45 GHz frequency, and heat transfer in the solid. For example, the penetration depth of NaCl particles with 5% moisture using 2.45 GHz microwave is 1.79 cm (C. Liu et al., *High Temp. Mater. Processes,* 32(6) (2013) 587-596). If the sample depth is less than the penetration depth, then a portion of the provided energy is not directly utilized. Thus, it appears that a certain sample depth or volume is needed to enhance microwave heating in the solid. It should be noted here that microwaves of lower frequency penetrate deeper in the sample than microwaves of higher frequency. Thus, for large samples in scaled-up applications, frequencies lower than 2.45 GHz may be needed.

Figures 9A, 9B:
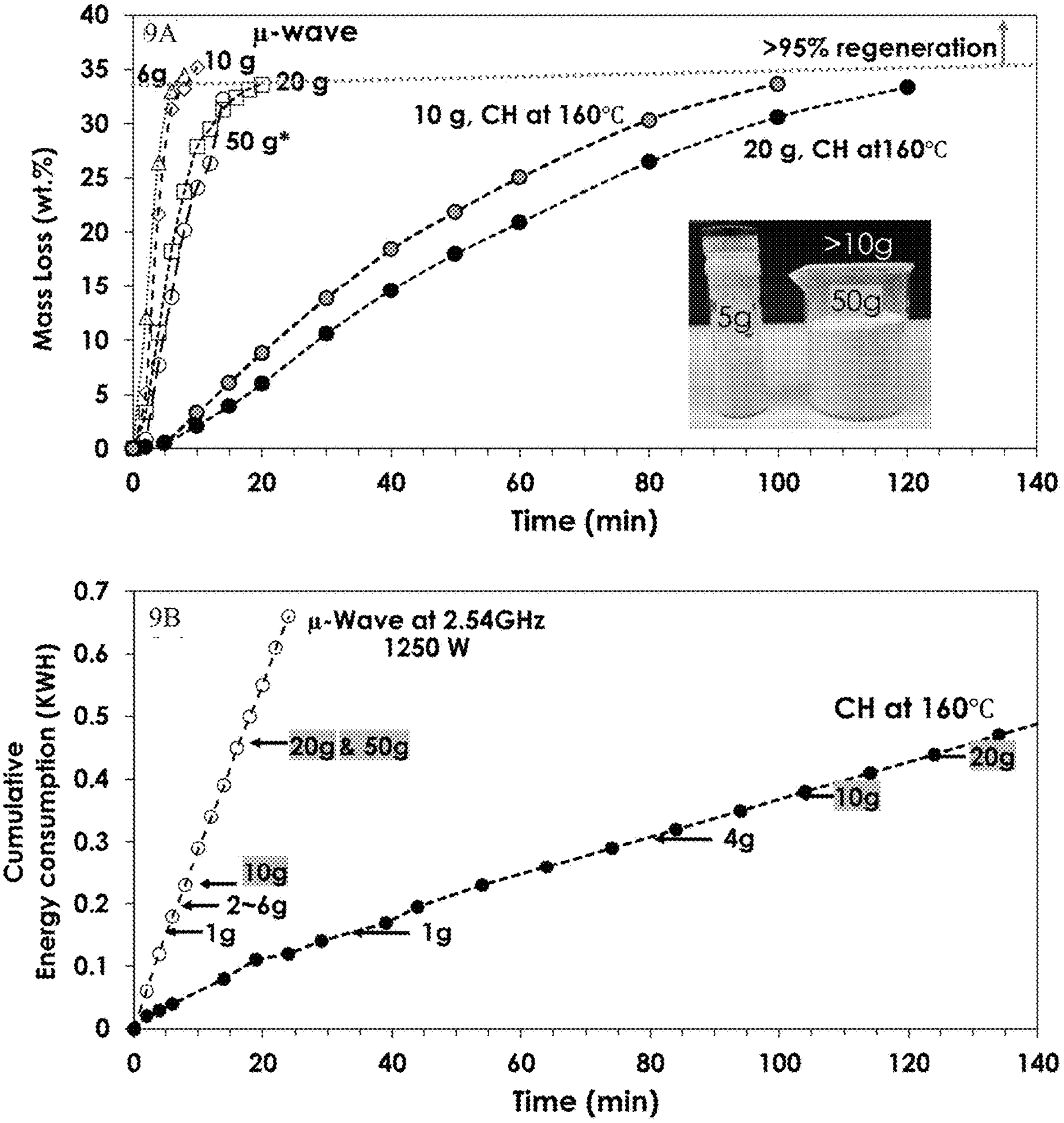
FIGS. 9A-9B.

Further microwave regeneration experiments were performed to compare with conductive-heating regeneration, with the data shown in FIGS. 9A and 9B. For samples <10 g, full microwave regeneration, i.e., 33 wt % mass loss equivalent to >95% regeneration, occurred in <10 min, while conductive heating required >100 min for full regeneration. Note that for 10 g, microwave heating is up to ~17 times faster than conventional conductive heating, resulting in 40% energy reduction. At >10 g, ~16 min of microwave irradiation was required to fully regenerate 20 g, compared to 120 min of conductive heating for 20 g. The surge of required microwave irradiation time for full regeneration may be associated with the intrinsic short penetration depth of microwaves of 2.45 GHz frequency in the solid volume. At <10 g, a 30-mL glass container (2-cm dimeter) was used, while at >20 g, a 150-mL beaker (5-cm diameter) was used. Results in FIG. 9A indicate that optimization of sample mass and depth, as well as microwave frequency and power, may be used to minimize the regeneration energy per unit mass of $CO_2$ produced. Even without optimizing these parameters, however, microwave regeneration has clear advantages over conductive-heating regeneration, including regeneration rate and total energy required.

FIG. 9B shows that the energy consumption rate (slope of line) of the microwave oven is ~5 times higher than that for conductive-heating oven at 160° C. However, due to the fast regeneration kinetics, microwave regeneration consumes up to 40% less energy than conductive-heating for full regeneration of the 10-g sample. For the 20-g sample, the benefit of microwave regeneration over conductive-heating regeneration in terms of energy consumption is minimal. When the sample size was increased to >20 g, the sample holder was changed to 150 mL beaker of 5-cm diameter. Note that the wt. % mass loss rate of 50 g is slightly higher than the one of 20 g. This is because of partial degradation of the sample due to a hot spot, but intact solid sample from the 50 g showed >95% regeneration efficiency. Table 3 shows the corresponding results. Also, when considering the energy consumption for preheating the conventional oven and the ramp time (i.e., 0.3 kWh measured for 20 min ramping from 25° C. to 160° C.), the cumulative energy consumption for conductive heating (i.e., 0.65 kWh for the 10 g sample) would be significantly higher than that needed for microwave heating.

TABLE 3

Measurements of Cumulative Energy Consumption of Microwave Oven and Convection Oven for Full Regeneration (~95%) of MGBIG Carbonate

| | Microwave oven (1250 W) | | Convection oven (160° C.) | |
|---|---|---|---|---|
| Sample amount (g) | Time (min) | Cumulative Energy (kWh) | Time (min) | Cumulative Energy(kWh) |
| 1 | 5 | 0.14 | 35 | 0.16 |
| 4 | 6 | 0.17 | 80 | 0.30 |
| 6 | 6 | 0.17 | N/A | N/A |
| 10 | 8 | 0.22 | 100 | 0.36 |
| 20 | 16 | 0.46 | 120 | 0.43 |
| 50 | 14* | 0.46 | N/A | N/A |

*Thermal degradation occurred during microwave heating due to hot spot.

Figures 10A, 10B:
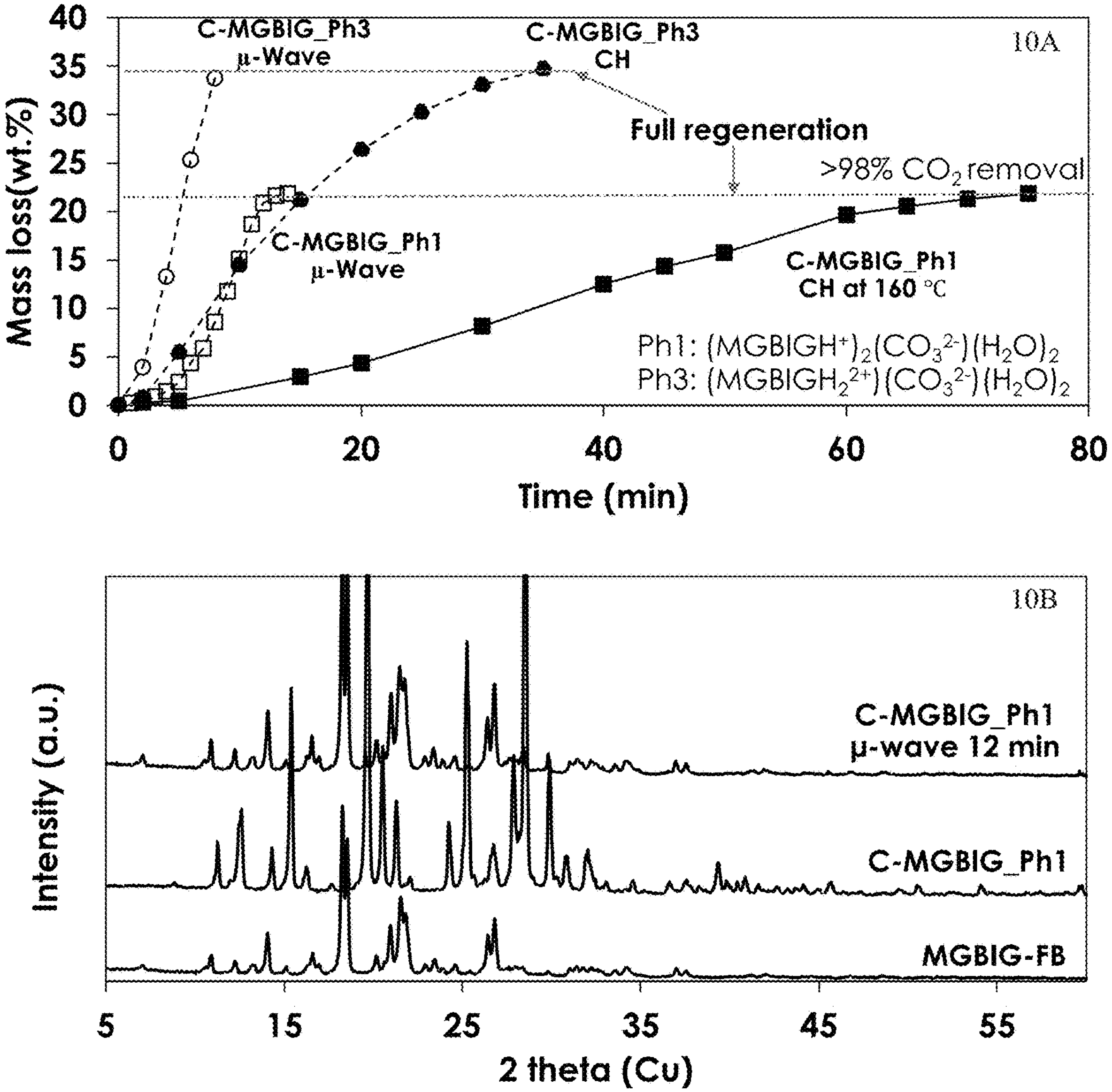
FIGS. 10A-10B.

Phase 1 of C-MGBIG needs more regeneration energy compared to C-MGBIG_Ph3 per unit mass lost. Nevertheless, as shown in FIG. 10A, the microwave regeneration is ~6 times faster than conductive heating. In the case of Phase 1 MGBIG carbonate, one MGBIG molecule binds 0.5 molecules of $CO_2$, while one MGBIG molecule binds 1 molecule of $CO_2$ in Phase 3. Microwave regeneration for C-MGBIG_Ph1 (solid blue circles) shows ~2.5 times lower desorption rate than that of C-MGBIG_Ph3 (open circles). Similarly, conductive-heating regeneration of C-MGBIG_Ph1 shows ~2 times lower desorption rate compared to that of C-MGBIG_Ph3. FIG. 10A also shows that the desorption rate for microwave regeneration of either phase is much higher than the desorption rate achieved with conductive-heating regeneration. After full regeneration, as shown in FIG. 10B, both C-MGBIG_Ph1 and C-MGBIG_Ph3 transformed into MGBIG-FB.

Figure 11:
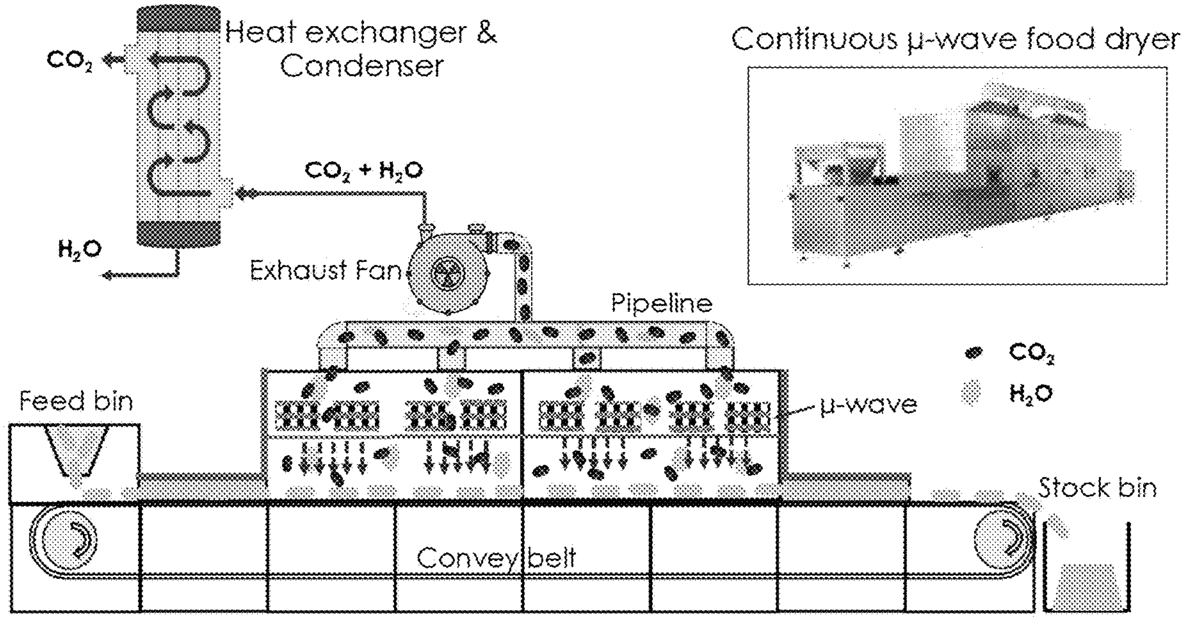
FIG. 11. Drawing of a large-scale continuous microwave regenerator for C-MGBIG pellets using a commercial microwave dryer with a conveyer belt.

Scale-up Microwave Regeneration: FIG. 11 shows a possible design of a large-scale continuous microwave dryer for C-MGBIG regeneration. Currently, industrial-scale microwave dryers at 915 MHz with conveyor belts are utilized for solids drying such as fruits in the food industry. In general, the 915 MHz has better penetration depth in the solid, so it may be better for uniform heating. Simple modification for gas collection may be easily adopted to achieve scalable microwave regeneration for solid sorbents.

CONCLUSIONS

A microwave-heating regeneration proof-of-concept has been investigated, and ultra-fast energy-efficient regeneration of solid sorbents was demonstrated using various MGBIG carbonates. Microwave irradiation has been shown to selectively heat up $CO_2$—$H_2O$ complexes bound in the MGBIG carbonate crystals, consequently leading to fast desorption. Microwave heating at 2.54 GHz and 1250 W has been found to be up to 17 times faster than conventional conductive heating at 160° C., resulting in 40% lower power consumption for the microwave oven compared to that for the conventional oven for the same mass of sorbent regenerated. Carbonate and XRD analysis indicated full regeneration of solid particles in a scalable manner up to 50 g, but additional testing at different frequencies (e.g., 915 MHz) may be useful in achieving more uniform and efficient heating to avoid hot spot formation, which has been shown to lead to sorbent degradation. Depending on sorbent type and different media properties and moisture content, all operational parameters may be optimized to ensure effective regeneration. The regeneration rate of MGBIG carbonate phase 1 is two times slower than that of MGBIG carbonate phase 3 due to lower $CO_2$ binding ratio to MGBIG. Still, the desorption rate for microwave regeneration of either phase is much higher than the desorption rate achieved with conductive-heating regeneration.

While there have been shown and described what are at present considered the preferred embodiments of the invention, those skilled in the art may make various changes and modifications which remain within the scope of the invention defined by the appended claims.

What is claimed is:

1. A method for regenerating an amine-containing sorbent useful in $CO_2$ capture, the method comprising exposing an amine-containing sorbent-$CO_2$ complex in the solid state to microwave radiation having a frequency of 2-5 GHz and power output of at least 1500 W for about 30 seconds to result in release of $CO_2$ and regenerated amine-containing sorbent that is uncomplexed with $CO_2$, wherein the amine-containing sorbent-$CO_2$ complex contains either:

(i) a carbamate bond; or (ii) an ion pair bond of the formula

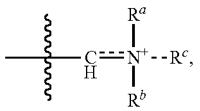

$\bullet nX^{m-}$, wherein $R^a$, $R^b$, and $R^c$ are selected from H and hydrocarbon groups containing at least one carbon atom, wherein at least one of $R^a$, $R^b$, and $R^c$ is H; the dashed double bond represents the presence or absence of a double bond, and the dashed single bond represents the presence or absence of $R^c$, wherein $R^c$ is present only if the double bond is not present; $X^{m-}$ is a carbonate or bicarbonate anion, with m being 1 for bicarbonate and 2 for carbonate; and n is an integer of 1 or 2, provided that n×m=2;

wherein the carbamate bond or ion pair bond results from direct or indirect reaction of at least one free amine group in the uncomplexed sorbent with $CO_2$; wherein the amine-containing sorbent-$CO_2$ complex is a solid complex; wherein the regenerated amine-containing sorbent contains at least one free amine group capable of directly or indirectly reacting with $CO_2$ to produce the amine-containing sorbent-$CO_2$ complex; and wherein the amine-containing sorbent is a bis(iminoguanidinium) compound having the following structure:

(2a)

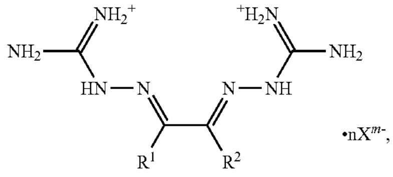

$\bullet nX^{m-}$, wherein $R^1$ and $R^2$ are independently selected from H and methyl groups.

2. The method of claim 1, further comprising an initial step of producing the amine-containing sorbent-$CO_2$ complex by contacting a gaseous source containing $CO_2$ with an aqueous solution of the amine-containing sorbent that captures the $CO_2$ by forming a carbamate bond or ion pair bond by reaction of the $CO_2$ with an amine group in the sorbent.

3. The method of claim 1, wherein the bis(iminoguanidinium) compound of Formula (2a) precipitates and is removed from the aqueous solution as a solid sorbent-$CO_2$ complex.

4. The method of claim 1, wherein the regenerated amine-containing sorbent is re-used to capture $CO_2$.

5. The method of claim 1, wherein $R^1$ is H and $R^2$ is methyl in the bis(iminoguanidinium) compound of Formula (2a).

6. The method of claim 1, wherein the sorbent-$CO_2$ complex is a sorbent-$CO_2$-water complex.

* * * * *